No. 823,193. PATENTED JUNE 12, 1906.
J. W. SNEDEKER.
WIRE FABRIC MACHINE.
APPLICATION FILED AUG. 16, 1905.
19 SHEETS—SHEET 3.
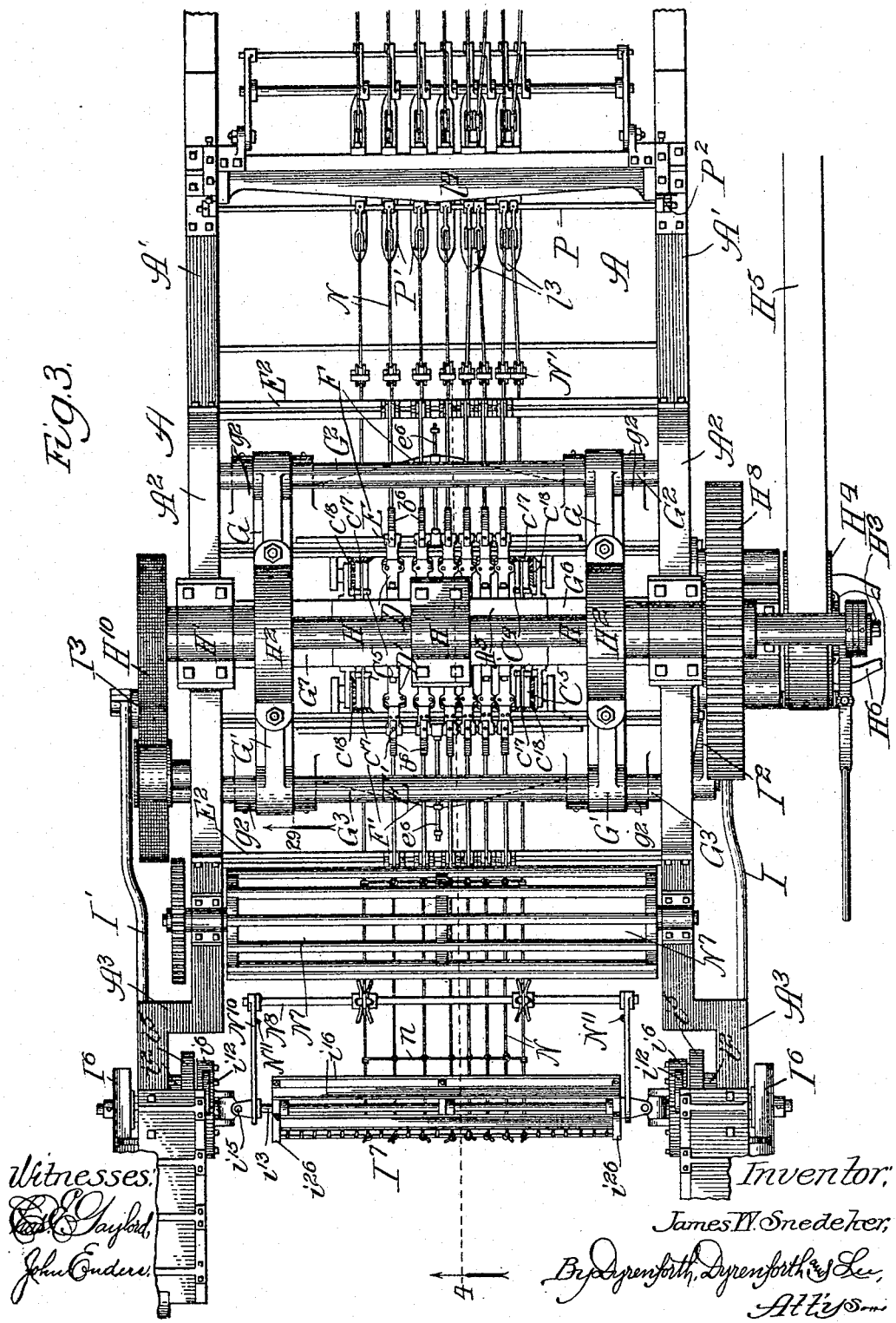

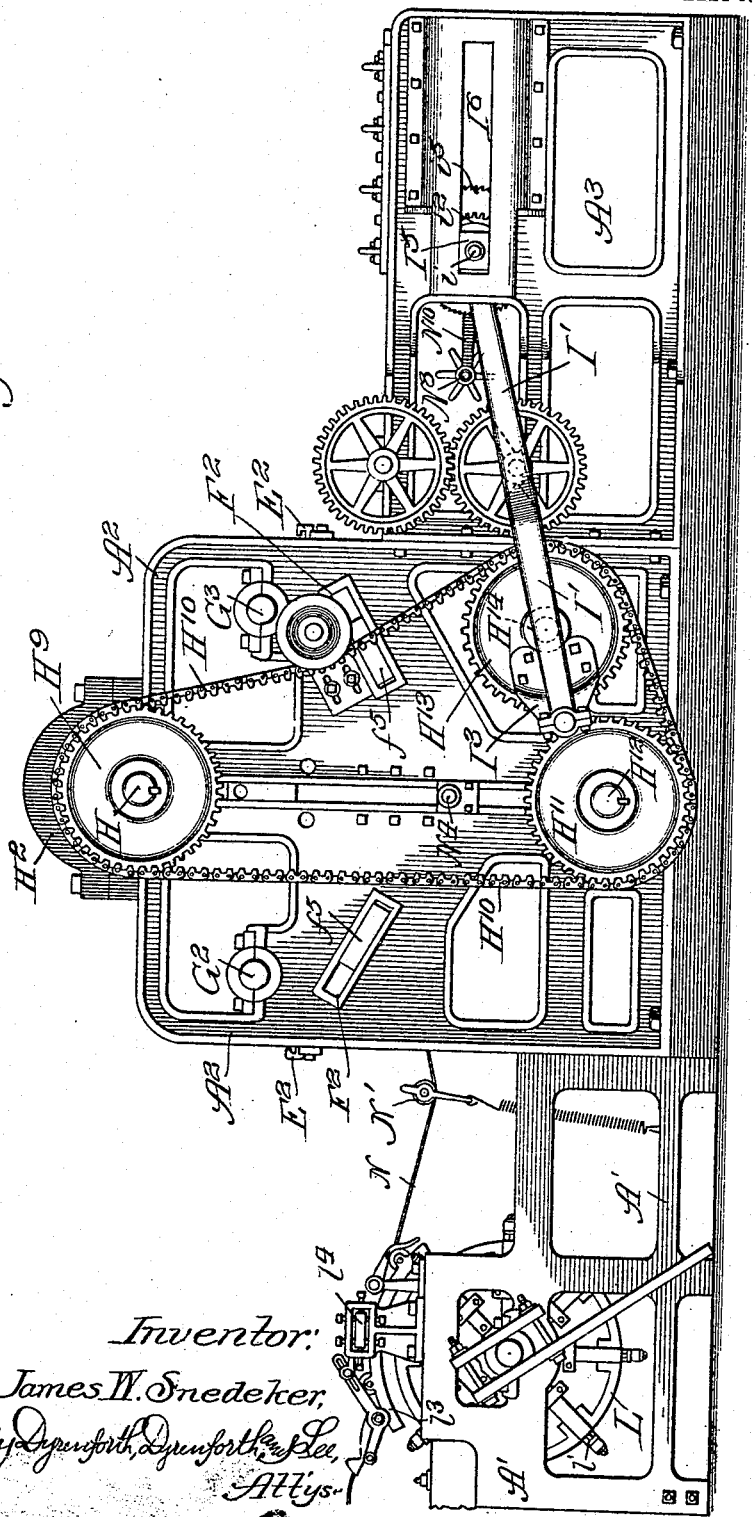

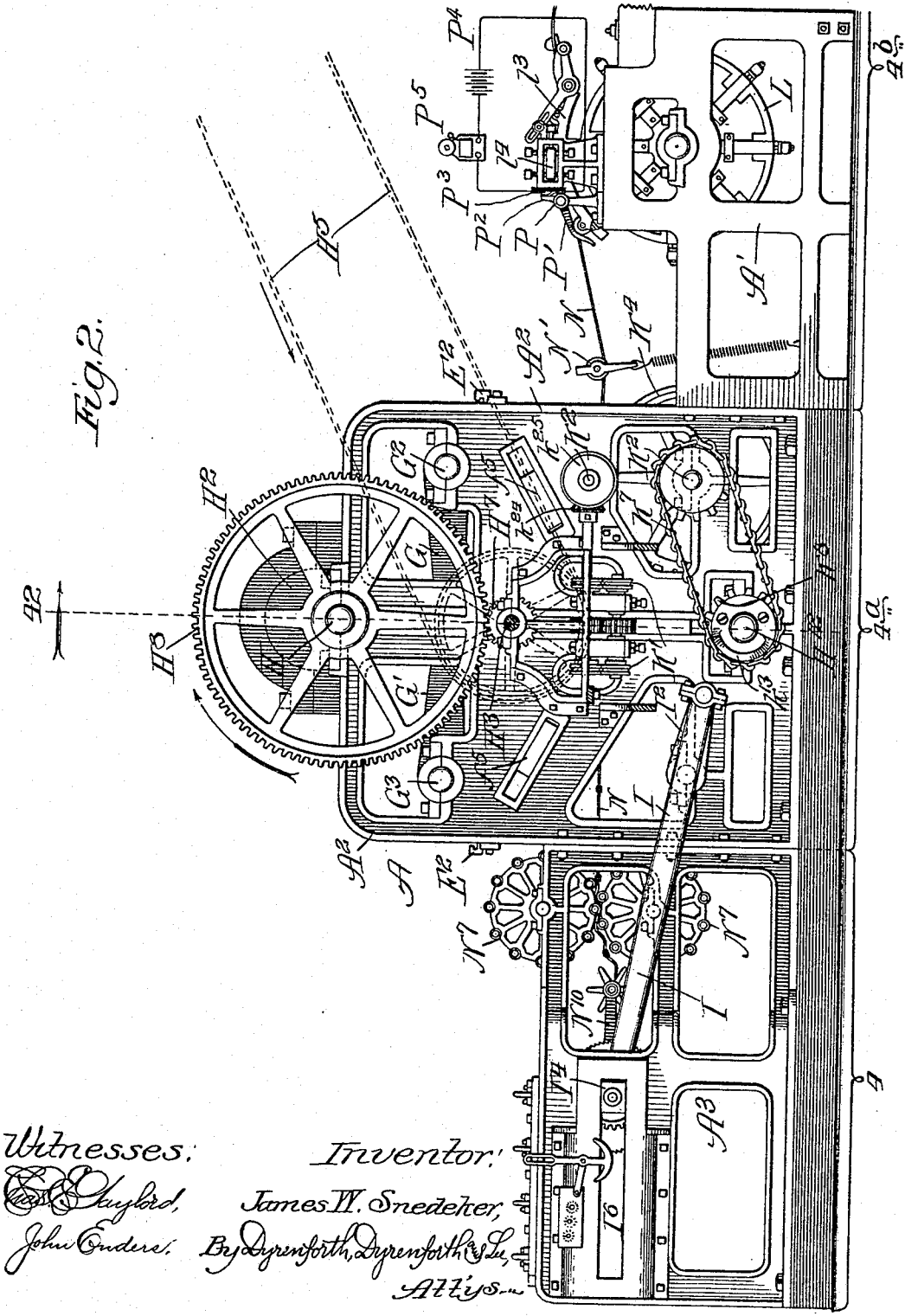

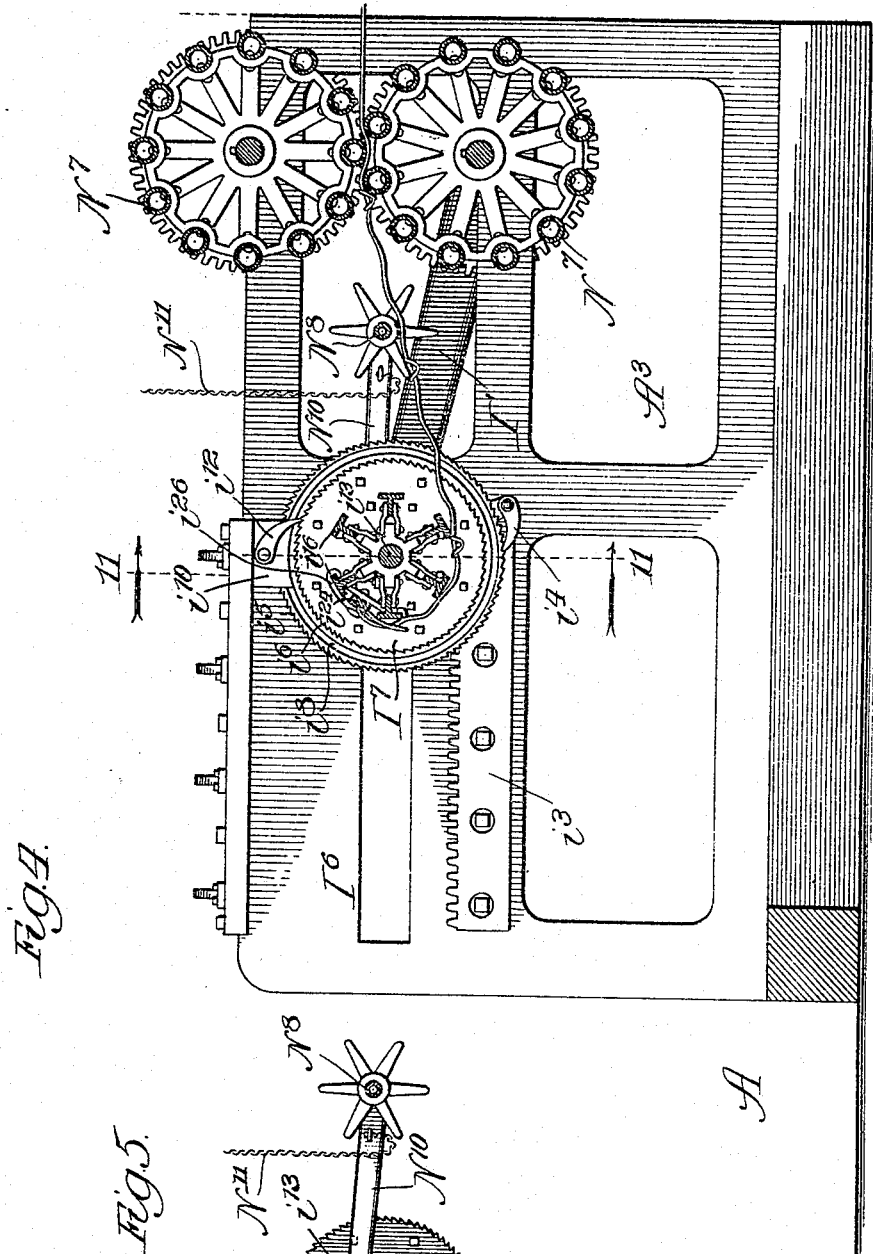

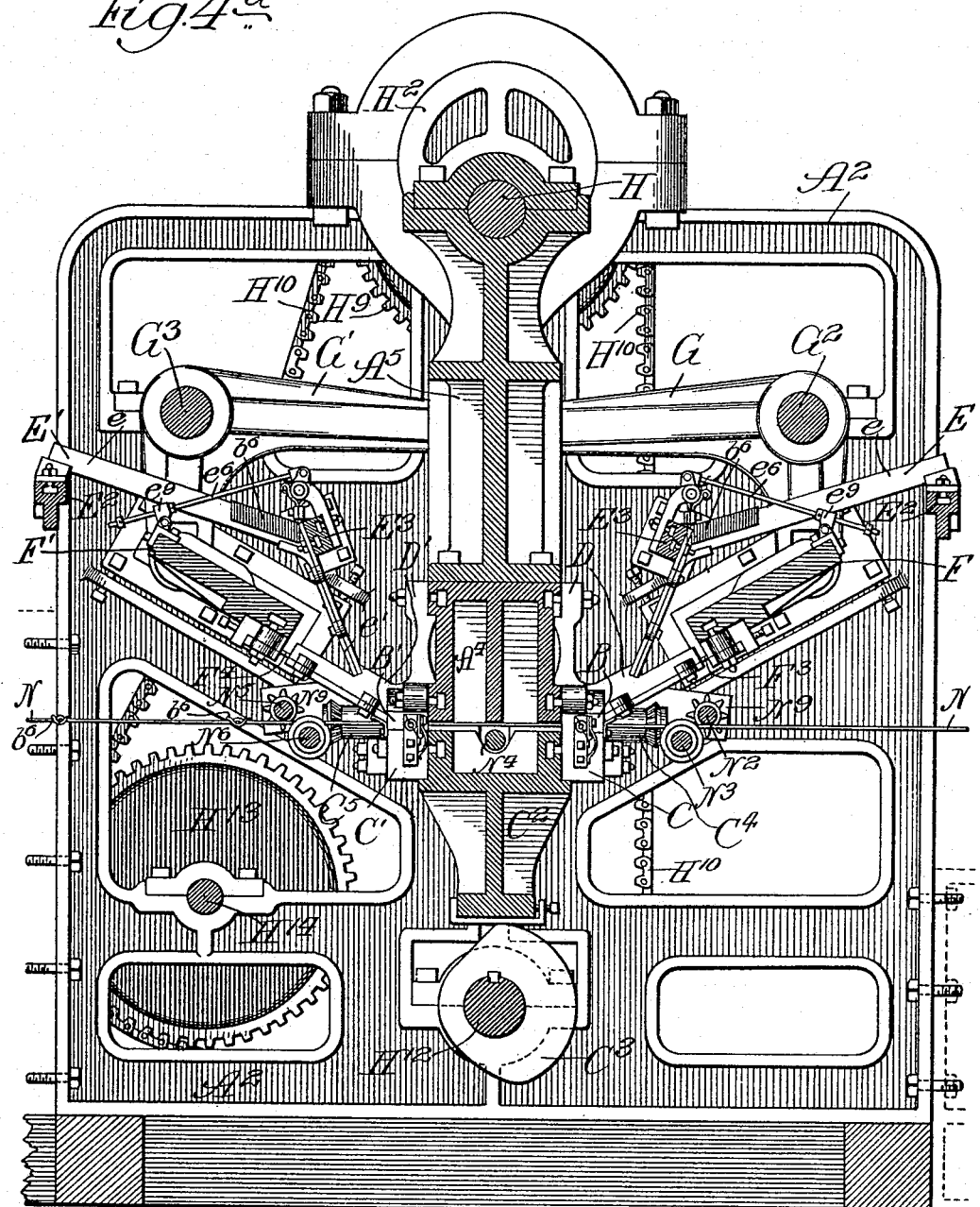

No. 823,193. PATENTED JUNE 12, 1906.
J. W. SNEDEKER.
WIRE FABRIC MACHINE.
APPLICATION FILED AUG. 16, 1905.
19 SHEETS—SHEET 6.
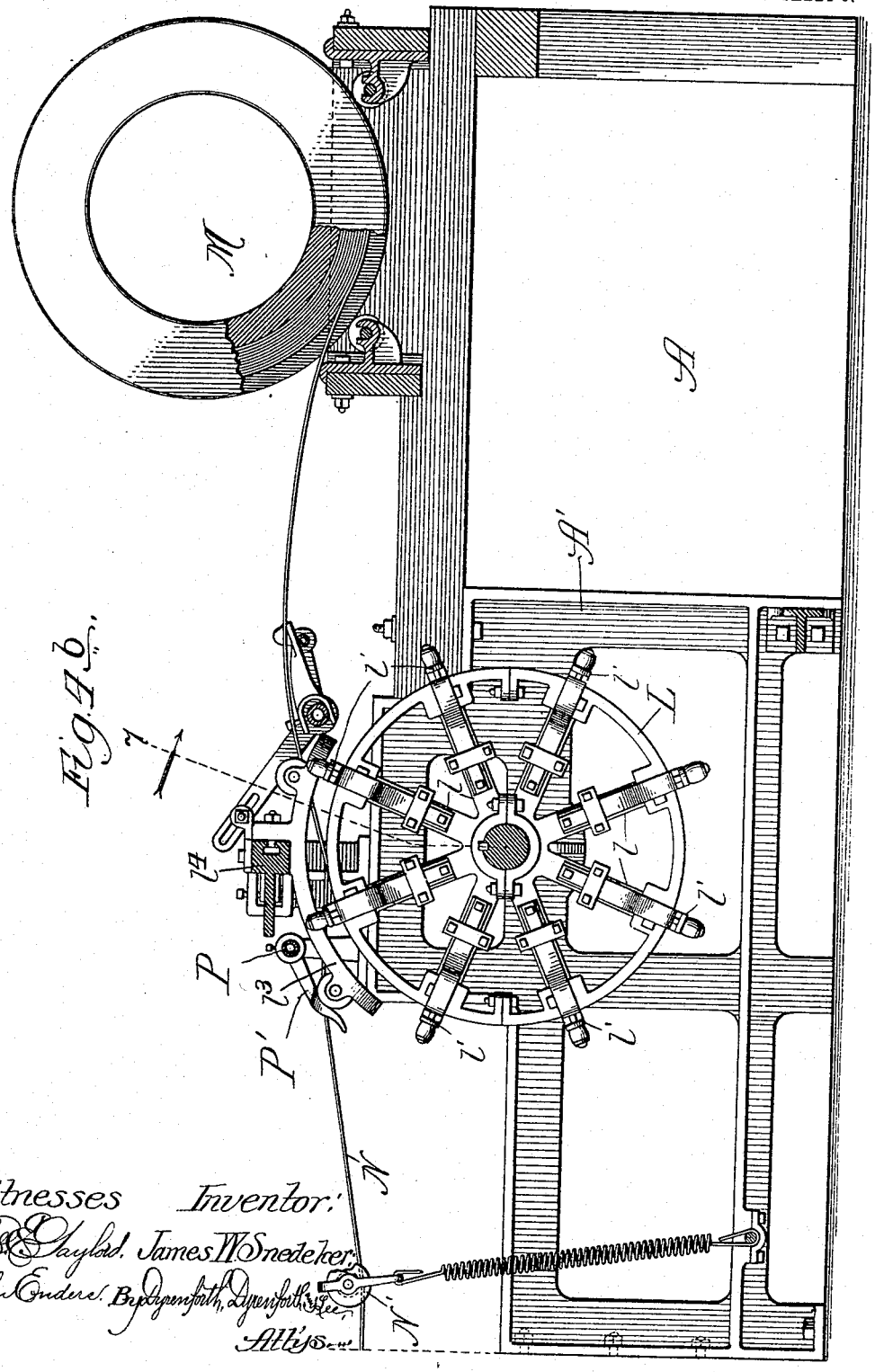

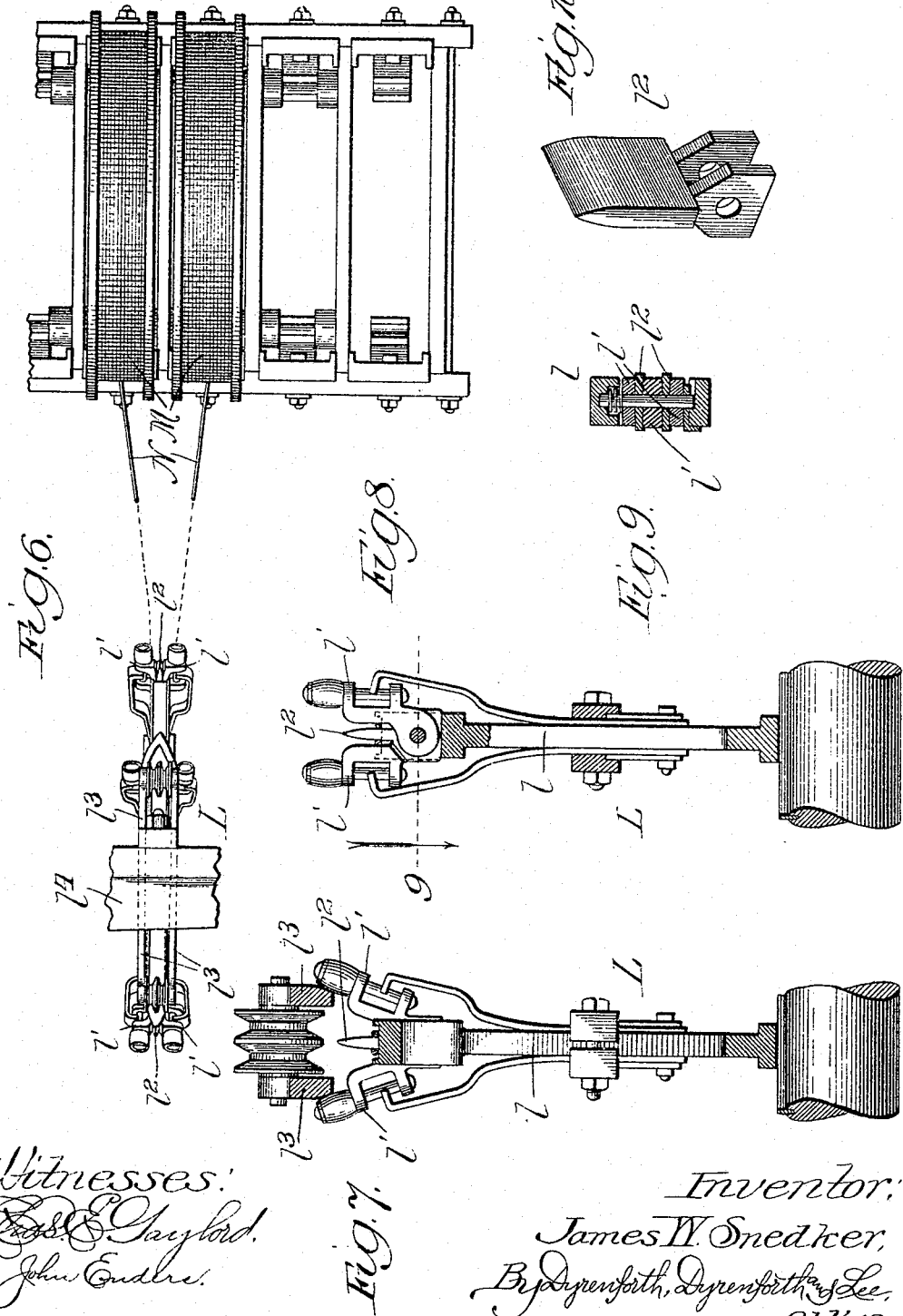

No. 823,193. PATENTED JUNE 12, 1906.
J. W. SNEDEKER.
WIRE FABRIC MACHINE.
APPLICATION FILED AUG. 16, 1905.
19 SHEETS—SHEET 8.
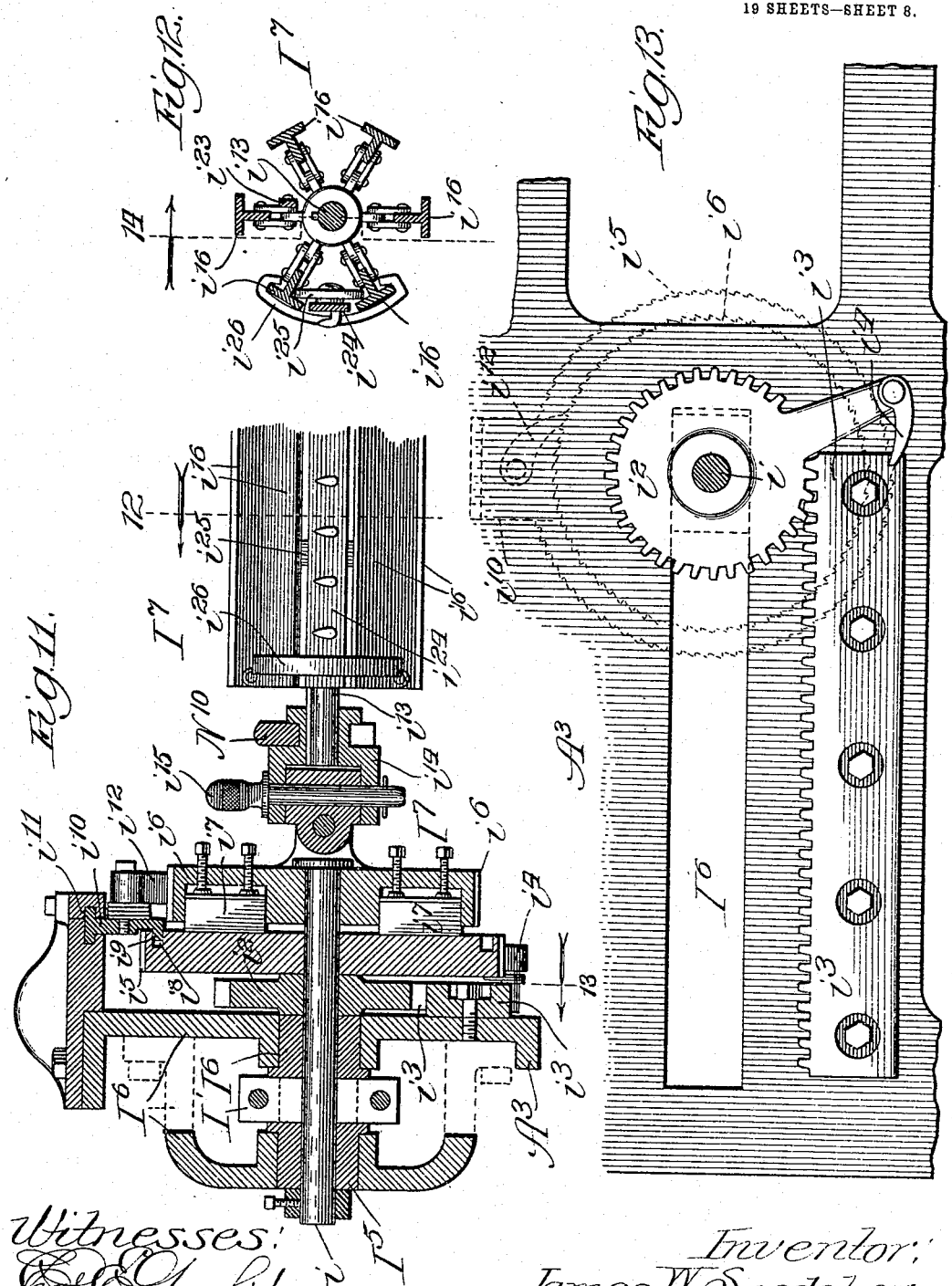

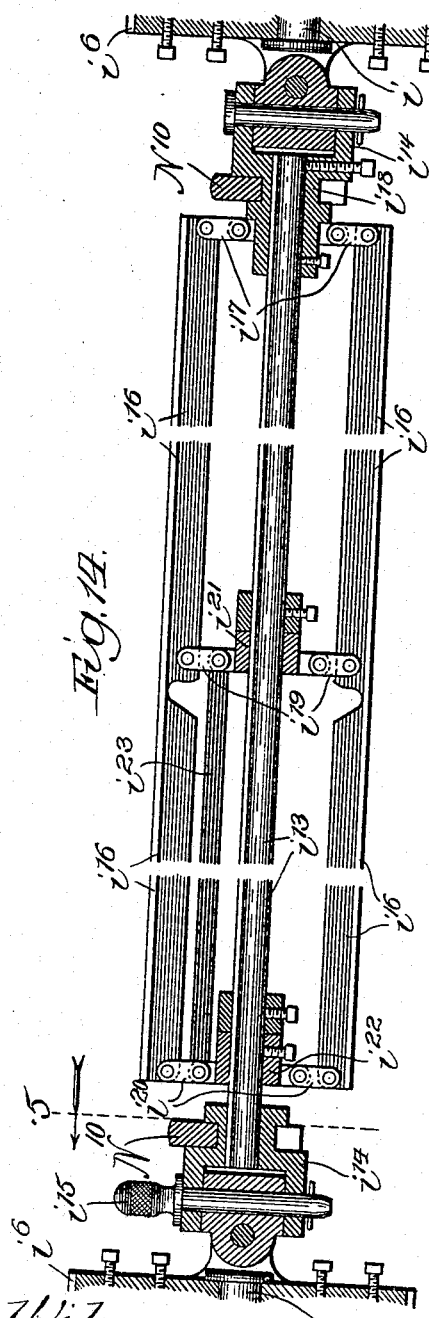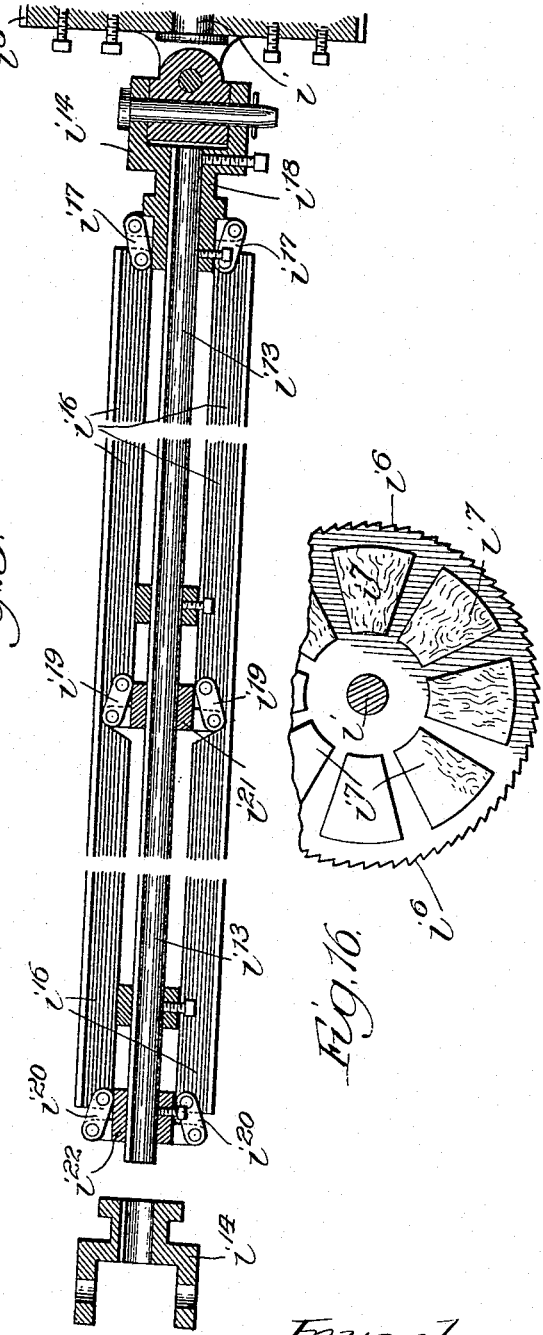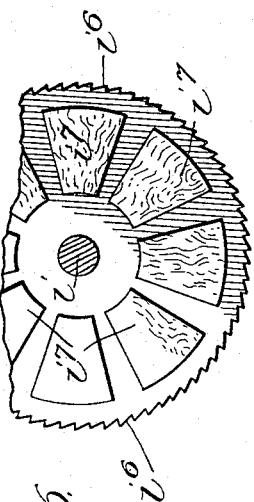

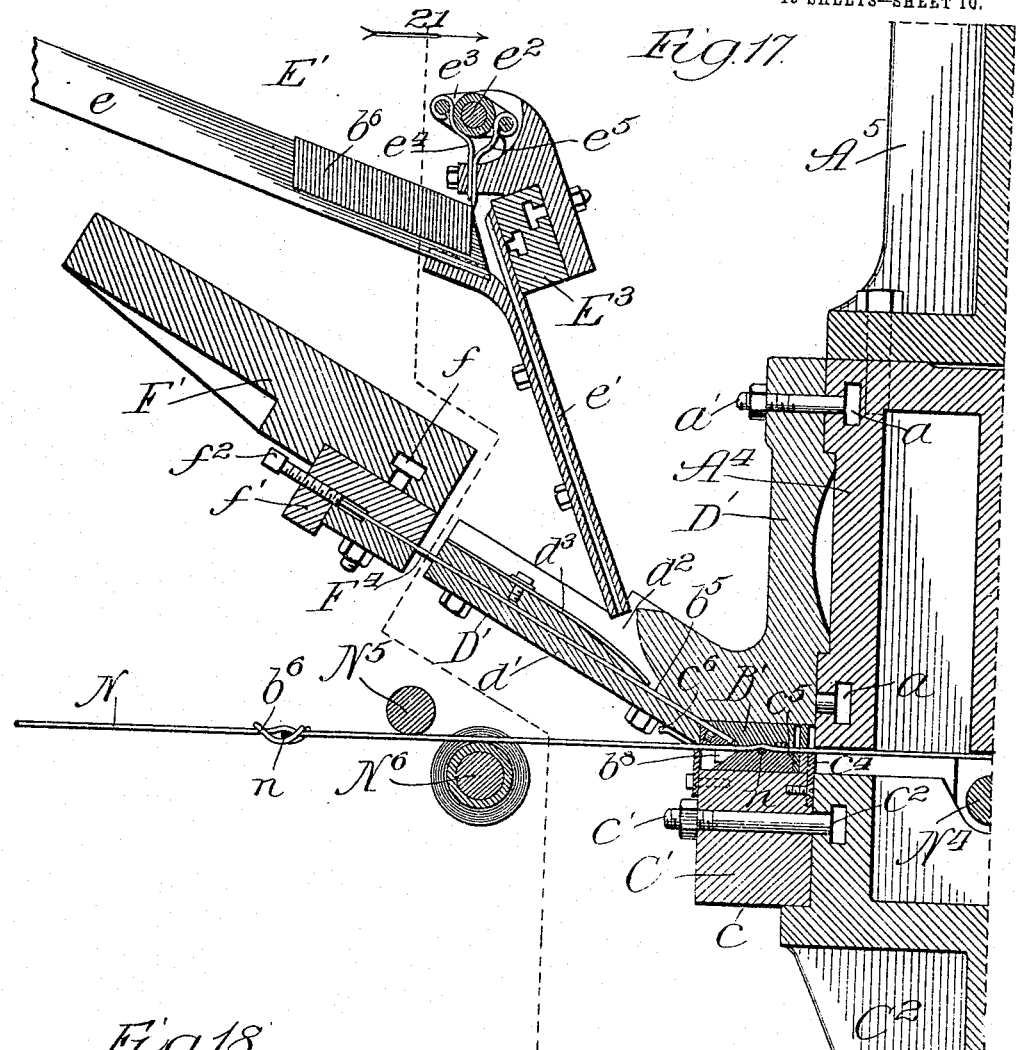
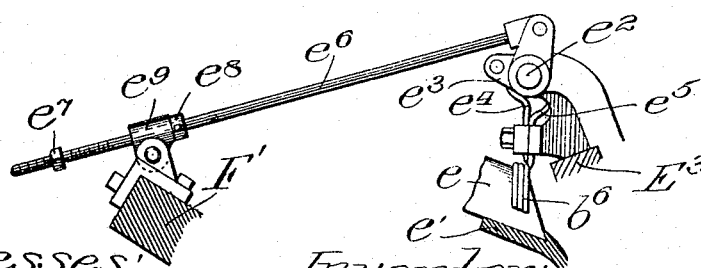

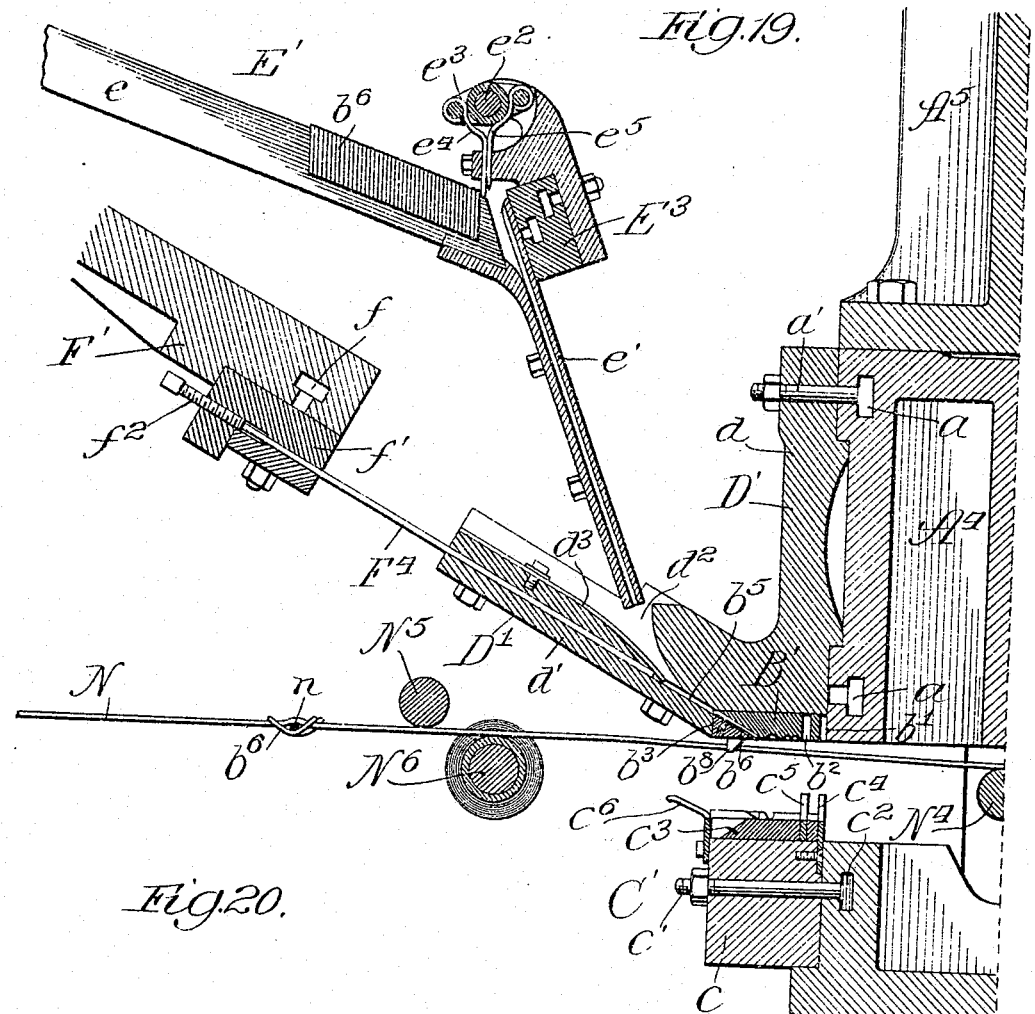
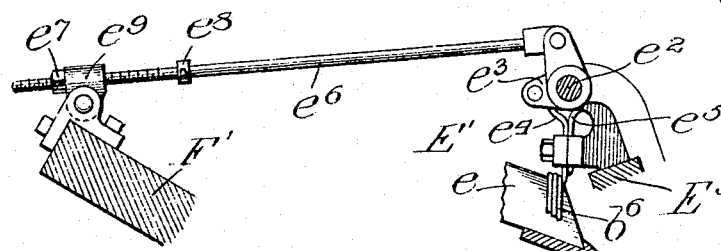

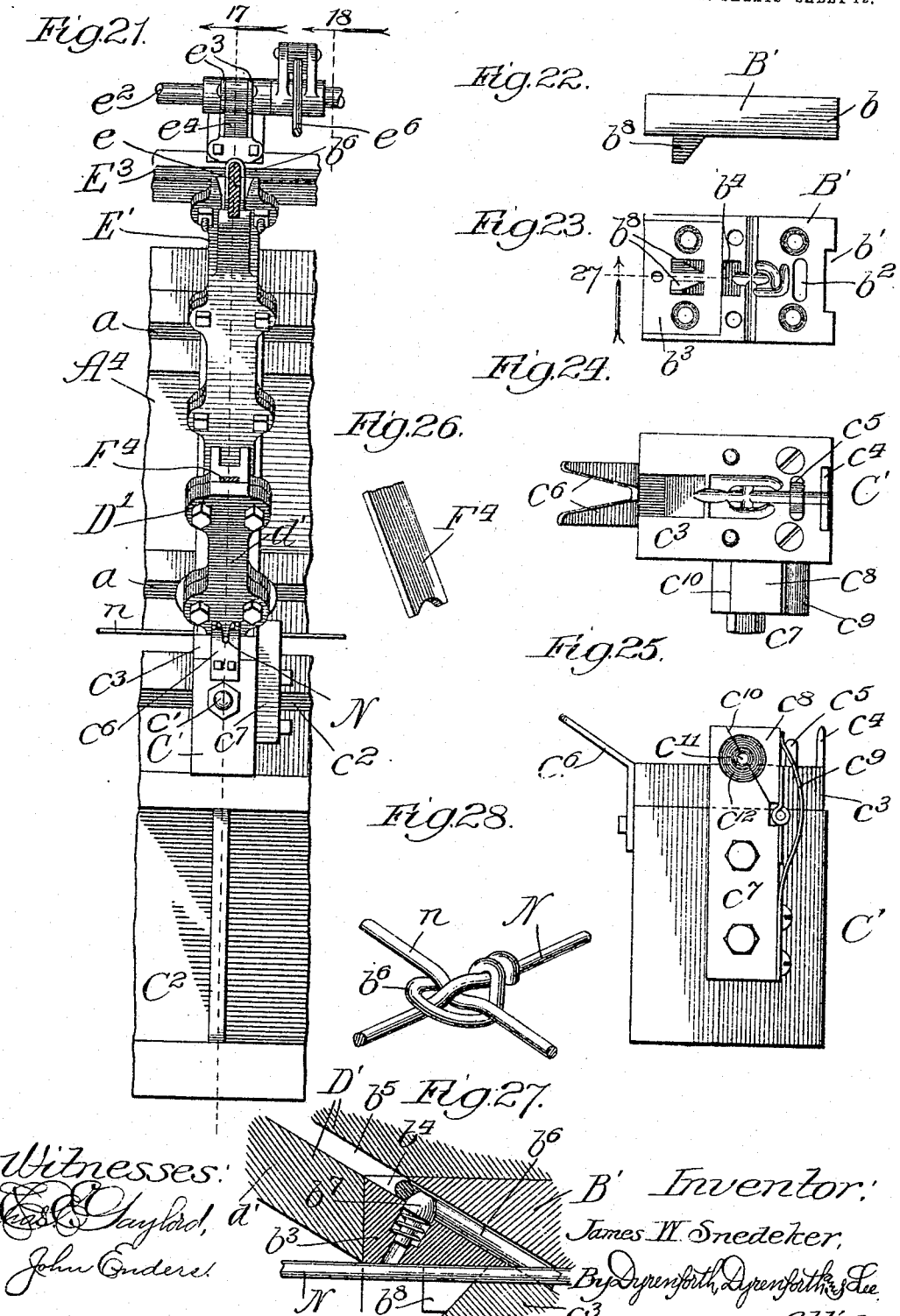

No. 823,193. PATENTED JUNE 12, 1906.
J. W. SNEDEKER.
WIRE FABRIC MACHINE.
APPLICATION FILED AUG. 16, 1905.
19 SHEETS—SHEET 13.

Witnesses: Inventor:
James W. Snedeker,

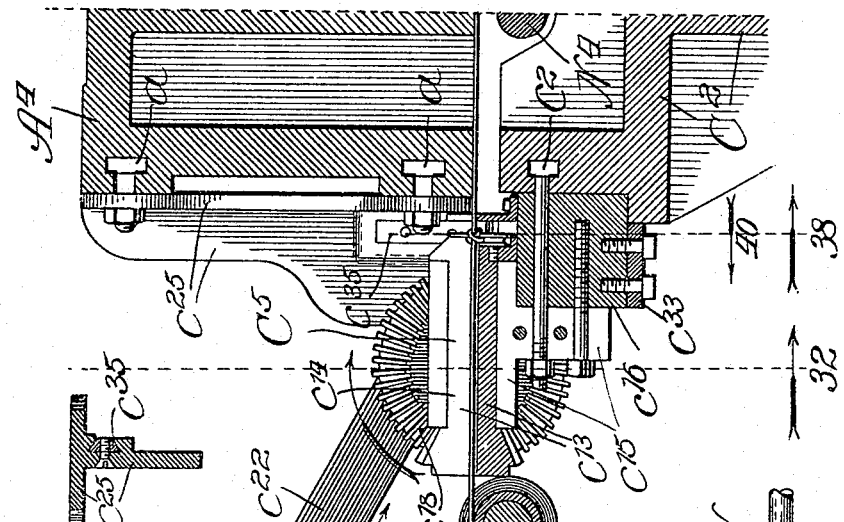

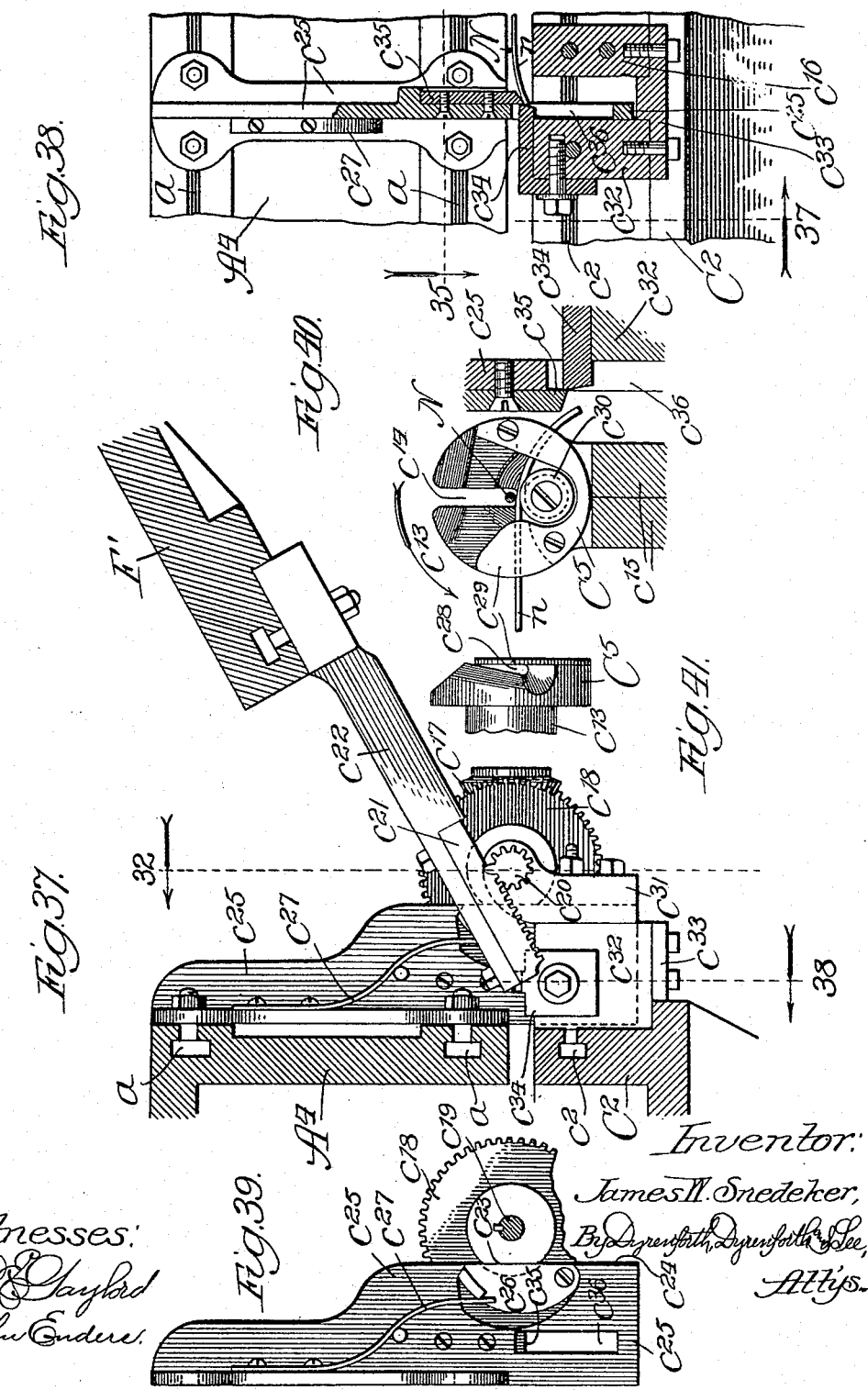

No. 823,193. PATENTED JUNE 12, 1906.
J. W. SNEDEKER.
WIRE FABRIC MACHINE.
APPLICATION FILED AUG. 16, 1905.
19 SHEETS—SHEET 16.
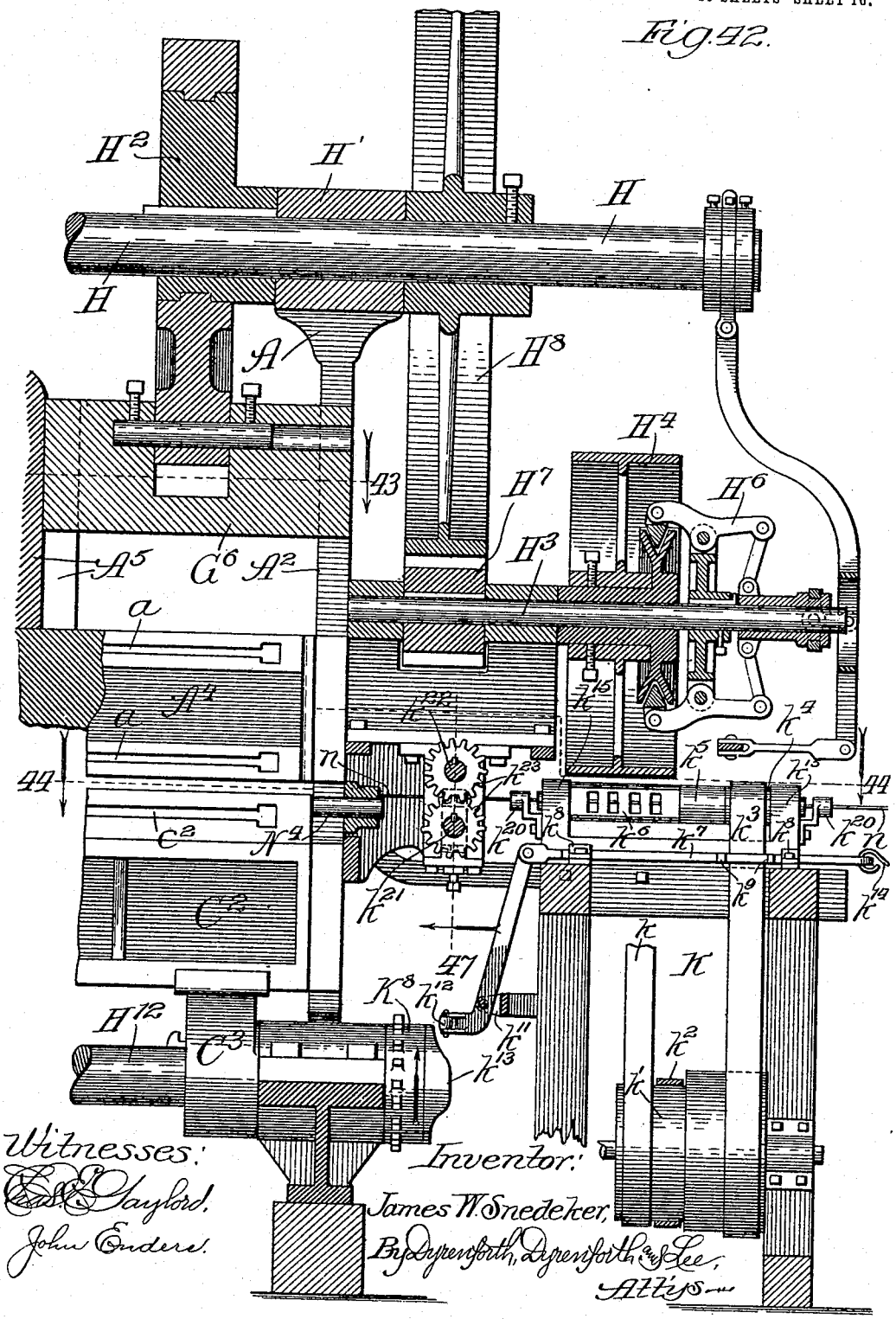

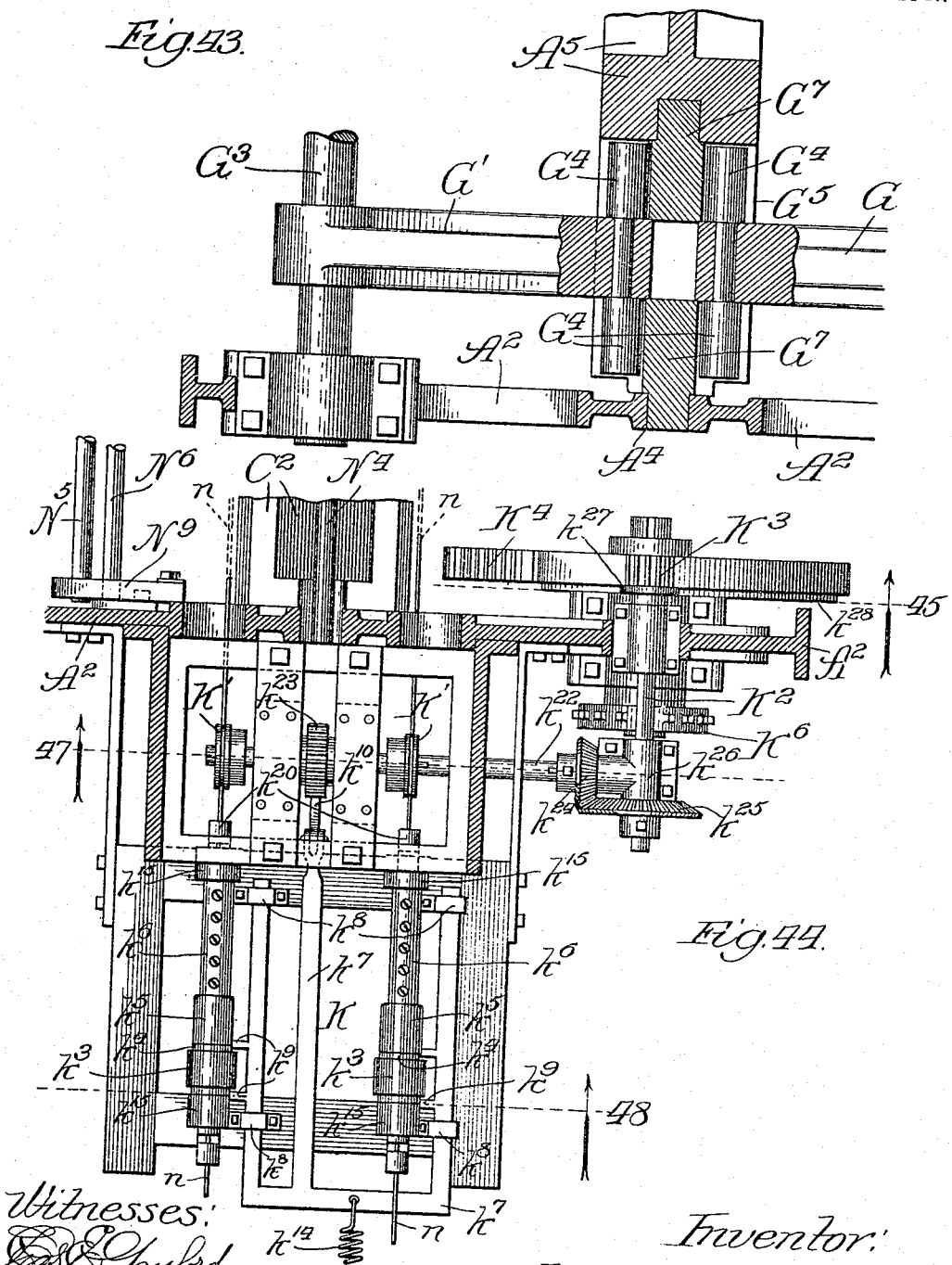

No. 823,193.
PATENTED JUNE 12, 1906.
J. W. SNEDEKER.
WIRE FABRIC MACHINE.
APPLICATION FILED AUG. 16, 1905.
19 SHEETS—SHEET 18.
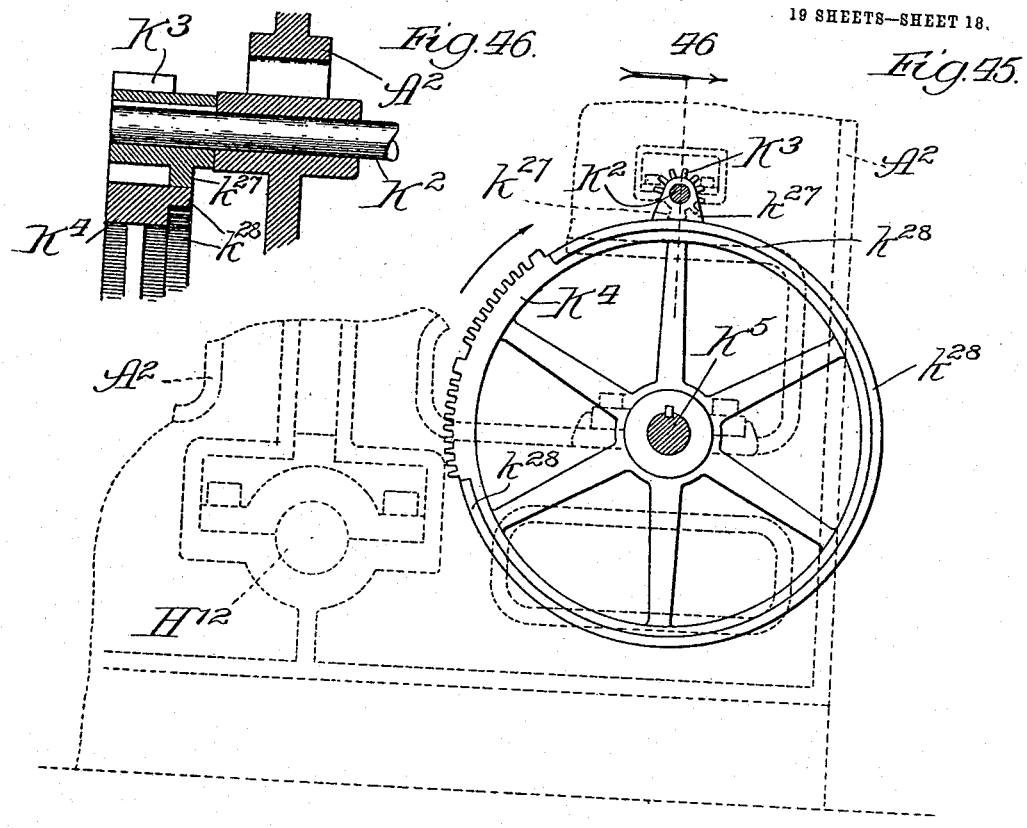
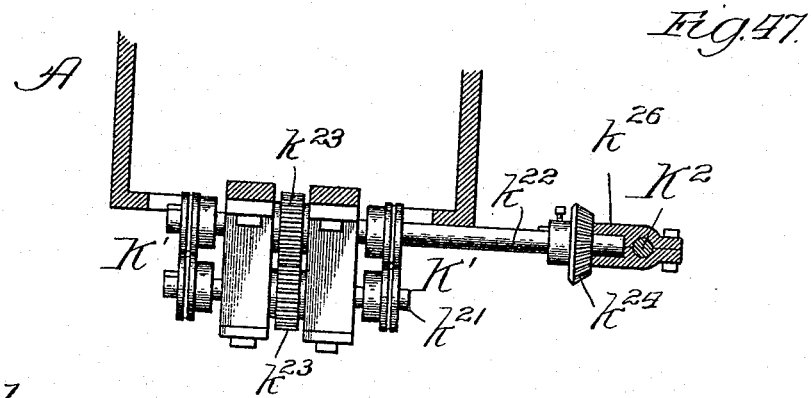

No. 823,193. PATENTED JUNE 12, 1906.
J. W. SNEDEKER.
WIRE FABRIC MACHINE.
APPLICATION FILED AUG. 16, 1905.
19 SHEETS—SHEET 19.
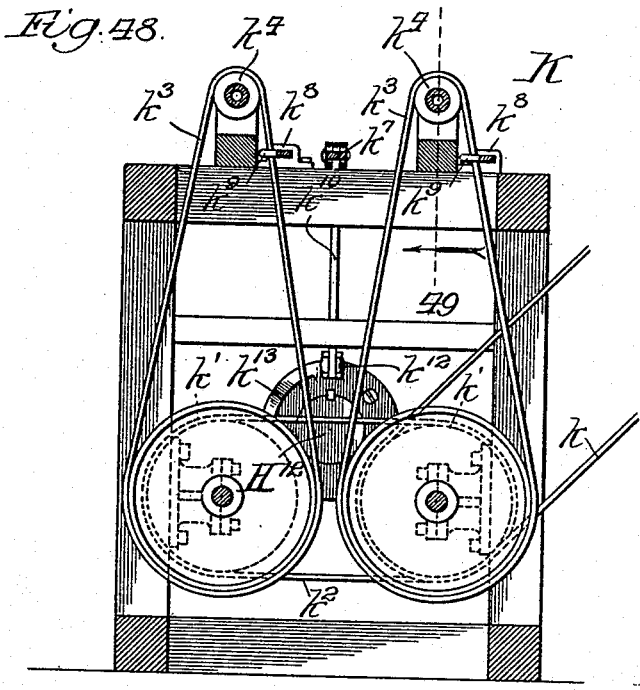
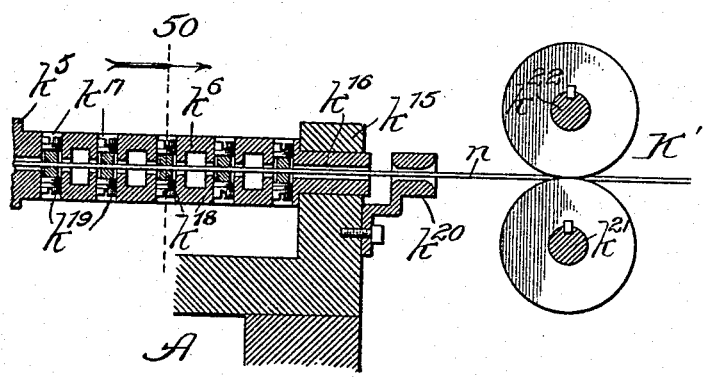
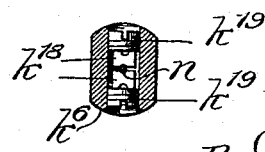
Witnesses:
E. E. Gaylord.
John Enders.
Inventor:
James W. Snedeker,
By Dyrenforth, Dyrenforth & Lee,
Attys.

UNITED STATES PATENT OFFICE.

JAMES W. SNEDEKER, OF ADRIAN, MICHIGAN, ASSIGNOR TO PAGE WOVEN WIRE FENCE COMPANY, OF ADRIAN, MICHIGAN, A CORPORATION OF MICHIGAN.

WIRE-FABRIC MACHINE.

No. 823,193.        Specification of Letters Patent.        Patented June 12, 1906.

Application filed August 16, 1905. Serial No. 274,383.

*To all whom it may concern:*

Be it known that I, JAMES W. SNEDEKER, a citizen of the United States, residing at Adrian, in the county of Lenawee and State of Michigan, have invented a new and useful Wire-Fabric Machine, of which the following is a specification.

My invention relates particularly to machines for making wire fence having stay-wires connected with the strand-wires or the major portion of them by means of staples.

My primary object is to provide a thoroughly practicable machine of this character having greater capacity than has heretofore been developed in machines of this type.

The invention is illustrated in its preferred embodiment in the accompanying drawings, in which—

Figure 30:
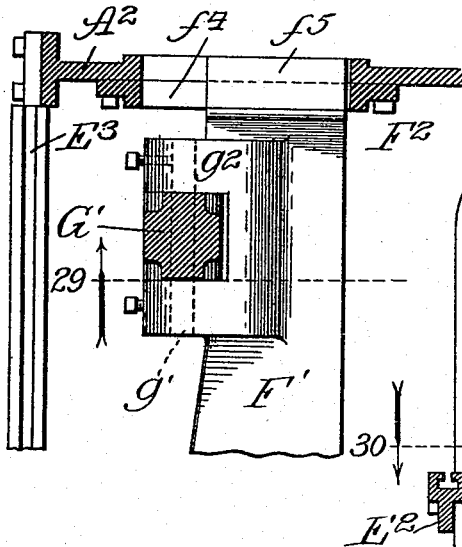
Figure 29:
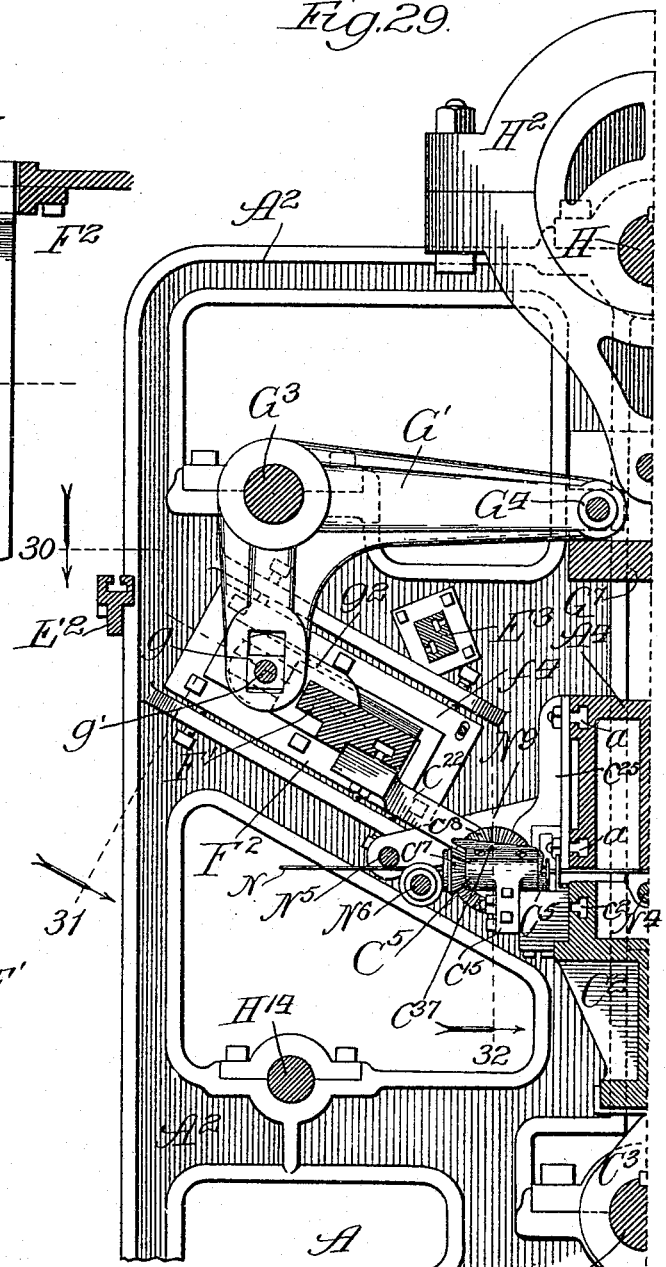
Figure 31:
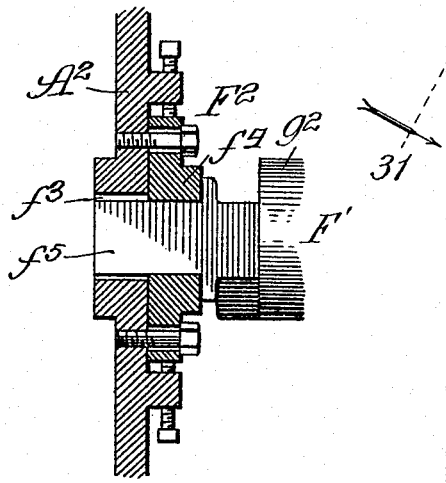

Figure 1 is a view of the left side (facing with the machine) of my improved fence-loom; Fig. 2, a right side view of the same; Fig. 3, a plan view of the same; Figs. 4, 4$^a$, and 4$^b$, alined sections taken as indicated at line 4 of Fig. 3, the portion of the machine shown in each of said figures corresponding with the portion indicated by the correspondingly-numbered bracket on Fig. 2; Fig. 5, Sheet 4, a detailed sectional view taken as indicated at line 5 of Fig. 14; Fig. 6, a broken plan view showing a portion of the mechanism for measuring the strand-wires as they are fed into the machine; Fig. 7, an enlarged broken section taken as indicated at line 7 of Fig. 4$^b$ and showing a detail of the measuring-drum; Fig. 8, a similar section showing a different position of the parts; Fig. 9, a section taken as indicated at line 9 of Fig. 8; Fig. 10, a perspective view of a clamping member employed in connection with the measuring-drum; Fig. 11, an enlarged broken section taken as indicated at line 11 of Fig. 4, showing details of the take-up mechanism; Fig. 12, a section taken as indicated at line 12 of Fig. 11; Fig. 13, a section taken as indicated at line 13 of Fig. 11; Fig. 14, a section taken as indicated at line 14 of Fig. 12; Fig. 15, a similar section showing the drum of the take-up mechanism in collapsed condition; Fig. 16, a broken view of a friction ratchet-wheel employed in connection with the take-up mechanism; Fig. 17, an enlarged section taken as indicated at line 17 of Fig. 21 and showing in detail a pair of dies and the stapling mechanism operating in connection therewith; Fig. 18, a broken section taken as indicated at line 18 of Fig. 21 and showing the escapement of the stapling mechanism; Fig. 19, a section similar to the section shown in Fig. 17, but illustrating a different position of the parts; Fig. 20, a section similar to the section shown in Fig. 18, but showing a different position of the escapement device; Fig. 21, a broken section taken as indicated at line 21 of Fig. 17; Fig. 22, a view of one of the upper or stationary dies; Fig. 23, a bottom plan view of the same; Fig. 24, a top plan view of one of the lower vertically-reciprocating dies; Fig. 25, a side view of the same; Fig. 26, a broken perspective view of the lower or operative end of one of the staple-driving plungers; Fig. 27, a full-sized sectional view taken as indicated on line 27 of Fig. 23, showing a pair of dies in the closed position and a staple entered in position to be operated upon by the plunger; Fig. 28, a broken perspective view showing the connection between a strand-wire and a stay-wire; Fig. 29, a sectional view taken as indicated at line 29 of Figs. 3 and 30, showing particularly the manner of operating one of the cross-heads which actuates the staple-driving plungers; Fig. 30, a section taken as indicated at line 30 of Fig. 29, showing the manner of guiding the cross-head last named; Fig. 31, a section taken as indicated at line 31 of Fig. 29; Fig. 32, an enlarged broken section taken as indicated at line 32 of Figs. 29 and 37 and showing in detail one of the knotting devices employed at a marginal strand-wire; Fig. 33, a section taken as indicated at line 33 of Fig. 32; Fig. 34, a section taken as indicated at line 34 of Fig. 32; Fig. 35, a section taken as indicated at line 35 of Fig. 38 and showing the manner of attaching one of the upper stay-severing knives; Fig. 36, a view of a knot formed at one of the marginal strand-wires of the fence; Fig. 37, a section taken as indicated at line 37 of Figs. 32 and 38, showing the position of the parts just after the knotting operation has been performed; Fig. 38, a section taken as indicated at line 38 of Figs. 33 and 37; Fig. 39, a view in side elevation of certain of the parts shown in Fig. 37; Fig. 40, a section taken as indicated at line 40 of Fig. 33, showing the operative end of one of the knotters; Fig. 41, a side elevational view of the operative end of said knotter; Fig. 42, an enlarged broken section taken as indicated at line 42 of Fig. 2, showing details of the power transmission, including means for intermittently actuating the stay-feeding rolls; Fig. 43, a section taken as indicated at line 43 of Fig. 42; Fig. 44, a section taken as indicated at line 44 of Fig. 42; Fig. 45, a section taken as indicated at line 45 of Fig. 44; Fig. 46, a section taken as indicated at line 46 of Fig. 45; Fig. 47, a section taken as indicated at line 47 of Figs. 42 and 44; Fig. 48, a section taken as indicated at line 48 of Fig. 44; Fig. 49, a detail sectional view of one of the stay-straightening devices, the section being taken as indicated at line 49 of Fig. 48; Fig. 50, a section taken as indicated at the corresponding line of Fig. 49, and Fig. 51 a fragmentary view of the fence made by the machine.

It may be preliminarily stated that in the machine illustrated in the accompanying drawings the strand-wires are intermittently drawn through the machine by the operation of the take-up mechanism and that during each interval of retardation of the strand-wires two stays are applied, the connections with the intermediate strand-wires being made by means of staples and the ends of the stays being wrapped upon the marginal strand-wires. The upper dies are stationary, and the lower dies are actuated vertically by a common cross-head. The stays are supplied from spools of wire, being fed transversely into the machine by intermittently-actuated feed-rolls, suitable straightening devices operating to straighten the wire and suitable severing devices at both sides of the machine operating to render the stays of the exact length desired. The preferred take-up mechanism comprises a drum which is bodily moved longitudinally of the machine to draw the strand-wires through and which is rotated during its return movement to wrap the fence upon itself.

In the preferred construction described more in detail, A represents a frame shown formed in sections $A'$ $A^2$ $A^3$, the side members of the intermediate section $A^2$ being joined by a heavy beam $A^4$, Fig. $4^a$, which supports a centrally-arranged standard $A^5$; B B', two series of upper stationary dies adjustably connected with the cross-beam $A^4$, Fig. $4^a$; C C', two series of lower dies carried by a vertically-reciprocating cross-head $C^2$, actuated by cams $C^3$; $C^4$ $C^5$, two pairs of knotting devices, the members of each pair being in transverse alinement with the corresponding dies; D D', two series of staple-guides with which the upper dies B B', respectively, are connected, said staple-guides being adjustably connected with the cross-bar $A^4$ of the frame, as shown in Figs. 17 and 19; E E', two series of staple-magazines adjustably carried by cross-bars $E^2$ $E^3$, connecting the side members of the frame-section $A^2$; F F', Figs. 3, $4^a$, 29, 30, and 31, a pair of reciprocating cross-heads moving in inclined guides $F^2$ at the side members of the frame-section $A^2$; $F^3$ $F^4$, two series of staple-driving plungers carried, respectively, by the cross-heads F F'; G G', two pairs of bell-crank levers mounted upon transverse shafts $G^2$ $G^3$ and having their depending arms connected with the cross-heads F F' in the manner shown in Figs. 29 and 30 and their horizontal arms extending toward each other, as shown in Fig. $4^a$, and equipped with rollers $G^4$, working in slots $G^5$, provided in vertically-reciprocating cross-heads $G^6$ $G^7$, Figs. 3 and 43; H, a shaft journaled in bearings H' and equipped with eccentrics $H^2$, connected with the vertically-movable cross-heads $G^6$ $G^7$, as shown in detail in Fig. 42; $H^3$, a short power-shaft equipped with a pulley $H^4$, operated by a belt $H^5$ and connected with the shaft $H^3$ by a friction clutch device $H^6$; $H^7$, a pinion on the shaft $H^3$, operating a gear $H^8$ upon the shaft H; $H^9$, Fig. 1, a gear on the opposite end of the shaft H, with which is connected a chain $H^{10}$, which through the medium of the gear $H^{11}$ actuates a counter-shaft $H^{12}$ and through the medium of a gear $H^{13}$ actuates a crank-shaft $H^{14}$; I I', a pair of connecting-rods actuated by cranks $I^2$ $I^3$, the latter carried by the wheel $H^{13}$; $I^4$ $I^5$, a pair of reciprocating blocks movable in longitudinal guides $I^6$, with which the frame-section $A^3$ is provided at its sides; $I^7$, a removable and collapsible drum carried by the blocks $I^4$ $I^5$ and equipped with suitable means for turning the drum during the return stroke of the blocks; K, Figs. 42, 44, and 48, stay-straightening mechanism including means for intermittently actuating the rotary devices which act upon the wire in the straightening operation; K', intermittently-actuated stay-feeding means, Fig. 44, equipped with a shaft $K^2$, provided with a pinion $K^3$, actuated by a segmental gear $K^4$, the gear $K^4$ being mounted on a short shaft $K^5$, equipped with a sprocket-wheel $K^6$, actuated by a chain $K^7$, joined to a sprocket-wheel $K^8$ on the shaft $H^{12}$, as shown in Fig. 2; L, a measuring-drum over which the longitudinal wires pass in a well-known manner in entering the machine, and M spools from which the strand-wires are taken.

The frame A may be of any suitable construction and need not be described more in detail. Ordinarily each side member of the frame is of integral construction.

As has been stated, the upper stationary dies of the B series are carried by the staple-guides of the D series, and the upper dies of the B' series are carried by the staple-guides of the D' series. The transverse frame member $A^4$ is provided at its front and rear sides with T-slots $a$, receiving adjustable bolts $a'$, by means of which the staple-guides and through the medium thereof the upper dies are adjustable transversely to enable the distance between strand-wires to be regulated at will. In Figs. 22 and 23 is shown one of the upper dies, and in Fig. 19, for instance, is shown the manner in which the base portions of the staple-guides are socketed to receive the upper dies. Each upper die comprises a rectangular block $b$, equipped with vertical guide channels or slots $b'$ $b^2$ and provided with a removable lower section $b^3$, Fig. 27. The die has an inclined staple-channel $b^4$, which registers with the inclined staple-channel $b^5$ in the corresponding staple-guide. The staple-driving plunger works in these channels, so that the members D D' may be regarded as staple-guides and plunger-guides as well. The channel $b^4$ is formed at the meeting plane of the removable section $b^3$ and the main body of the die, as best shown in Fig. 27. In that figure is shown a staple $b^6$ in position to be engaged by a plunger, and it will be observed that the staple is retained by a spring-held retainer $b^7$, which works in a perforation in the die-section $b^3$ at right angles to the channel $b^4$. Each upper die is provided on its lower surface with a male member $b^8$, which is channeled to receive the strand-wire. Suitable channels are provided for the staple to perform the bending operation, but these need not be described in detail.

Each of the lower dies C C' comprises a block $c$, adjustably connected by a bolt $c'$ with a T-slot $c^2$ in the cross-head $C^2$, it being understood that the cross-head is provided at its front and rear vertical faces with these T-slots; a die proper $c^3$, carried by the block $c$ and equipped with male members $c^4$ $c^5$, which enter, respectively, the guide-channels $b'$ $b^2$ of the corresponding upper die; a guide $c^6$, having a channel for the strand-wire, and a guide $c^7$, having at its upper end a pivoted section $c^8$, normally retained in the closed position by a spring $c^9$, the member $c^8$ having an oblique surface $b^{10}$, which meets a corresponding oblique surface on the main section of the guide, as shown in Fig. 25. At the meeting plane of the two sections of the guide is provided a guide-perforation $c^{11}$ for a transverse stay, at the entering end of which is a conical depression $c^{12}$, which serves effectually to guide the stay into the perforation $c^{11}$. It will be understood that after a stay has been applied and the lower die moves downwardly while the fence moves rearwardly the section $c^8$ of the guide $c^7$ will open to allow the stay to escape from the guide, the parts being so timed that the stay follows approximately the oblique surface $c^{10}$ in leaving the guide. Screws are employed to connect the dies $c^3$ with the die-blocks, and screws are employed to connect the upper dies with the sockets therefor with which the staple-guides are provided.

The strand-wires (designated N) pass, as indicated in Figs. 4$^b$, 4$^a$, and 4, from the measuring-drum L, beneath spring-held sheaves N', between upper and lower shafts or rollers N$^2$ N$^3$, over the centrally-located shaft N$^4$, between rollers N$^5$ N$^6$, thence between crimping-drums N$^7$, and finally under the wheel-equipped shaft N$^8$ to the drum of the take-up mechanism. The crimping-drums preferably comprise spiders having their peripheries connected by pipes, the drums being geared together so that the pipes meet in staggered relation, as shown in Fig. 4, thereby to impart a wavy formation to the longitudinal wires of the fence. The shafts N$^2$ N$^5$ are carried by pivoted arms N$^9$, Figs. 4$^a$ and 44, so that the weight of the shafts rests upon the longitudinal wires. The shaft N$^8$ is carried by arms N$^{10}$, provided at their rear ends with downturned yokes which hook over the shaft of the take-up drum, as shown in Figs. 3 and 5. To the arms N$^{10}$ are connected chains N$^{11}$, which may be attached to any stationary support (not shown) to support the device when the take-up drum is removed.

As shown in Figs. 3 and 4$^a$, the pair of knotting devices C$^4$ is located in front of the vertically-reciprocating die-carrying beam C$^2$, and the pair of knotting devices C$^5$ is located in the rear of said beam, the disposition being such that there is a knotting device corresponding with each marginal strand-wire both in the front and in the rear of the beam C$^2$. Each knotting device comprises a longitudinally-disposed wrapper $c^{13}$, Figs. 32 and 40, having a slot $c^{14}$ for the strand-wire; a sectionally-constructed bearing $c^{15}$, connected with a block $c^{16}$, adjustably secured in the T-slot $c^2$; a beveled pinion $c^{17}$, formed integrally with the member $c^{13}$; a bevel-gear $c^{18}$, meshing with the pinion $c^{17}$ and carried by a short transverse shaft $c^{19}$, equipped with a pinion $c^{20}$, and a rack $c^{21}$, carried by a member $c^{22}$, adjustably connected, as shown in Fig. 37, with the corresponding one of the cross-heads F F'. As shown in Fig. 39, the hub of the beveled gear $c^{18}$ is provided with a flat surface $c^{23}$, which rides upon the vertical surface $c^{24}$ of a cam $c^{25}$, adjustably secured to the cross member A$^4$ of the frame. Set into the member $c^{25}$ is a pivoted controlling member $c^{26}$, held by a spring $c^{27}$, the member $c^{26}$ having a surface complemental to the surface $c^{23}$ of the hub of the gear $c^{18}$ and said member $c^{26}$ yielding to permit rotation of the gear-wheel. The rack $c^{21}$ operates upon the pinion $c^{20}$ after the upward movement of the die-carrying beam C$^2$ is completed and during the downward movement of the staple-driving cross-head. Fig. 37 shows the position of the parts after the beam C$^2$ has been raised by its cams and the bar F' has descended in the staple-driving operation, this being the position corresponding with the completion of the knotting operation. As shown in Fig.

37, the pinion $c^{20}$ preferably is provided with one large tooth, which is the tooth initially engaged by the rack in the knotting operation. Figs. 40 and 41 show the head of the wrapper $c^{13}$ provided with a transverse channel $c^{28}$ for the stay-wire, (designated as $n$.) The head is further equipped with a removable plate $c^{29}$ and with a roller $c^{30}$, which forms an antifriction-bearing for the stay in the operation of wrapping the stay about the strand-wire. Each shaft $c^{19}$ is journaled in a block $c^{31}$, carried by a block $c^{32}$, adjustably connected with the slot $c^2$ of the beam $C^2$. The block $c^{32}$ is joined to the block $c^{16}$ by a block $c^{33}$. The block $c^{32}$ carries a stay-severing blade $c^{34}$, which coöperates with a stay-severing blade $c^{35}$, connected with the member $c^{25}$ in the manner shown in Figs. 35 and 38. Each member $c^{25}$ is provided with a slot $c^{36}$, which enables the stay to pass between the blades. Each bearing $c^{15}$ is equipped with a shield or guide $c^{37}$, (shown in Figs. 29 and 32,) which operates to carry the stay-wire over the pinion $c^{17}$ as the fence is moved through the machine.

Each of the staple-guides D D' comprises a vertical attaching member $d$ and an inclined member $d'$ carried thereby, in which is provided the slot $b^5$, registering with the slot $b^4$ in the corresponding upper die. The channel $b^5$ is extended through the portion $d'$, and the plunger $F^4$ works therein, as shown in Fig. 19. An opening $d^2$ is provided at the upper side of the channel $b^5$, in which is located a curved flat spring $d^3$, upon which the staples fall. The lower extremity of the spring preferably extends slightly beyond the inner end of the plunger when the latter is retracted, so that the spring will be jarred somewhat as the plunger descends, thereby rendering more certain the descent of the staple into the path of the plunger.

A staple-magazine E or E', as the case may be, is located directly over each of the staple-guides, the staple-magazines being adjustable on the cross-bars $E^2$ $E^3$, as shown in Figs. 4ª and 19. Each magazine comprises an inclined bar $e$, upon which the staples are placed, a chute $e'$ extending downwardly on an incline and having its discharge end located at the opening $d^2$ of the corresponding staple-guide, a rock-shaft $e^2$, equipped with short levers $e^3$, having pivotally connected therewith escapement members $e^4$ $e^5$, located at each of the magazines, and an actuating-rod $e^6$, connecting each of the rock-shafts $e^2$ with the corresponding one of the reciprocating members F F', each connecting-rod being equipped with collars $e^7$ $e^8$ and extending through a perforated pivoted lug $e^9$, with which the cross-head is provided, affording a certain lost-motion connection between the connecting-rods and the cross-heads. The escapement motion thus provided is best illustrated in Figs. 18 and 20, which show different positions of the same mechanism.

The driving-bar actuating cross-heads F F' may be of any suitable form. As shown in Fig. 19, I have provided on the lower surfaces of the cross-heads adjacent to the inner or lower edges thereof T-slots $f$, with which are adjustably connected blocks $f'$, carrying the staple-driving plungers. Each plunger is adjustable in its block by means of a set-screw $f^2$. The guides $F^2$ for the cross-heads F F' are preferably of the construction shown in Figs. 30 and 31. As there shown, the side members of the frame-section $A^2$ are provided with relatively large slots $f^3$, whereat are arranged adjustable bearing-blocks $f^4$, which accurately receive the bearings $f^5$ of the cross-heads.

The bell-crank levers G G', as stated, have their horizontal arms joined to the vertically-reciprocating cross-heads $G^6$ $G^7$ in the manner shown in detail in Fig. 43. The cross-heads $G^6$ $G^7$ move in suitable vertical guides, as shown in this detail. The downturned arms of the bell-crank levers are equipped with slides $g$, pivoted on pins $g'$, Figs. 29 and 30, connected with bearings $g^2$, with which the plunger-carrying cross-heads are provided.

The power transmission may be variously modified. Preferably all of the operative parts, except the stay-straightening devices, are actuated from the shaft $H^3$, acting through the pinion $H^7$ and gear $H^8$ upon the shaft H, thence through the chain $H^{10}$ upon the counter-shafts $H^{12}$ and $H^{14}$. As has been indicated, the connecting-rods I I', which actuate the take-up mechanism, are actuated from the shaft $H^{14}$.

As best shown in Fig. 11, the rear end of each connecting-rod I I' is joined by a divided bearing to a short shaft $i$ extending through the corresponding one of the reciprocating blocks $I^4$ $I^5$. Upon each shaft $i$ is journaled a gear $i^2$, which works in the rack $i^3$, attached to the frame of the machine, and each gear $i^2$ is provided, Figs. 11 and 13, with an arm equipped with a pawl $i^4$, working on a ratchet-wheel $i^5$, the pawl slipping idly over the ratchet-wheel while the take-up drum is being carried bodily rearwardly in the operation of drawing the fence through the machine. On each shaft $i$ is also journaled a ratchet-wheel $i^6$, equipped at its side adjacent to the ratchet-wheel $i^5$ with adjustable friction-blocks $i^7$. As shown in Figs. 4 and 11, the ratchet-wheel $i^5$ is provided with an annular groove $i^8$, into which fits a curved projection $i^9$ of a slide $i^{10}$, which moves in a guide $i^{11}$ with which the frame-section $A^3$ is provided. Pivotally supported on the slide $i^{10}$ is a pawl $i^{12}$, which engages the ratchet-wheel $i^6$. It now will be understood that when the drum is carried rearwardly the pawl $i^4$ moves idly over the ratchet-wheel $i^5$ and the slide $i^{10}$ is carried rearwardly, preventing rotation of the ratchet-wheel $i^6$ while this movement of the drum takes place. During the return movement of the drum the ratchet-wheel $i^5$ is actuated through the medium of the pawl $i^4$, carried by the gear $i^2$, and through the friction connection with the ratchet-wheel $i^6$ the latter is rotated, thereby turning the drum and wrapping the fence upon it, the pawl $i^{12}$ playing idly over the ratchet-wheel $i^6$ during the return movement of the drum. The friction connection between the two ratchet-wheels enables relative movement between them to compensate for the enlargement of the drum due to the wrapping of the fence upon it. It will be understood, of course, that similar devices are employed at each end of the drum. The drum-shaft is designated $i^{13}$, and, as shown in Fig. 14, there is universal connection $i^{14}$ between each end of the drum-shaft and the corresponding ratchet-wheel $i^6$. At the left-hand end of the drum-shaft as shown in Fig. 14 there is provided a removable pin $i^{15}$, enabling the drum to be swung about one end to permit the fence to be removed, or, if desired, the whole drum may be removed and another one substituted. The drum preferably comprises bars $i^{16}$, joined at one end by links $i^{17}$ to a collar $i^{18}$ and joined intermediately and at the other end by links $i^{19}$ $i^{20}$ to sliding collars $i^{21}$ $i^{22}$. The links $i^{19}$ $i^{20}$ are joined by a link $i^{23}$. A hook-equipped bar $i^{24}$ is employed for connecting the ends of the strand-wires, this bar being removably secured in place by rotatable elongated buttons $i^{25}$, confined between the adjacent bars $i^{16}$. Removable yokes $i^{26}$ connect the bars $i^{16}$, between which is located the bar $i^{24}$, and lend rigidity to the structure.

The power mechanism for actuating the rotary wire-straightening devices K will be best understood by reference to Figs. 42, 44, 48, and 49. It comprises a belt $k$, Figs. 42 and 48, driven from any suitable source, a pair of pulleys $k'$, joined by a belt $k^2$ and actuated by the belt $k$, a pair of belts $k^3$, working in a vertical plane, a pair of idle pulleys $k^4$, Fig. 44, a pair of pulleys $k^5$, fixed to rotate with the wire-straightening devices $k^6$, a horizontally-disposed transversely-movable belt-shifter $k^7$, moving in guides $k^8$ and having belt-engaging yokes $k^9$, a lever $k^{10}$, Fig. 42, supported on a stationary pivot $k^{11}$ and equipped with a cam-roller $k^{12}$, engaged by a cam $k^{13}$, attached to the adjacent end of the shaft $H^{12}$, and a spring $k^{14}$, Figs. 42 and 44, which is connected with the shifter $k^7$ and with any stationary support (not shown) and which tends normally to hold the shifter at the outer end of its traverse, in which position the belts $k^3$ work on the idlers $k^4$. It will be noted that the high portion of the cam $k^{13}$ is short, and the object of this is to maintain the motion of the wire-straighteners only during the time in which the wires are being fed into the machine, thus preventing injury to the wires which would result from heating in case the straighteners were to operate while the wire remained stationary. One of the wire-straighteners $k^6$ is shown in detail in Figs. 49 and 50. It comprises a rotary member having the pulley $k^5$ formed integrally with it and the pulley $k^4$ journaled upon it, the straightener being journaled in bearings $k^{15}$. The straightener has a central longitudinal passage $k^{16}$ for the wire and is provided with threaded perforations $k^{17}$, intersecting the passage $k^{16}$ and containing reversible die-blocks $k^{18}$, adjustable by means of screws $k^{19}$. The exact details of construction are unimportant. As shown in Fig. 49, the wire passes over the straightener through a guide $k^{20}$ and thence between the stay-feeding rolls K'.

The details of the stay-feeding mechanism are best understood by reference to Figs. 44 to 47, inclusive. The feed-rolls are mounted on shafts $k^{21}$ $k^{22}$, joined together by gears $k^{23}$, as shown in Fig. 47. The shaft $k^{22}$ is extended forwardly and equipped with a beveled gear $k^{24}$, meshing with a beveled gear $k^{25}$ on the shaft $K^2$. The shafts $k^{22}$ and $K^2$ are joined by a bearing $k^{26}$, as shown in Fig. 44. As shown in Figs. 45 and 46, the pinion $K^3$ has its hub equipped with a cam $k^{27}$, which rides upon a cam or flange $k^{28}$, with which the gear $K^4$ is provided throughout that portion of its periphery which is not toothed. This expedient serves to prevent accidental rotation of the shaft $K^2$. Inasmuch as the sprocket-wheel $K^6$ is actuated from the shaft $H^{12}$, as hereinbefore explained, it will be understood that intermittent motion is communicated to the stay-feeding rolls from the shaft $H^{12}$. As has been indicated, the motion of the stay-feeding-rolls is timed with the motion of the stay-wire-straightening devices, so that the straightening devices will operate only when the stay-wires are in motion.

The details of the measuring-drum L, about which the strand-wires pass in entering the machine, are unimportant, and no claim thereto is made in this application. For clearness of understanding only certain of the details are shown in Fig. 6 to 10, inclusive, which will be understood when considered in connection with Fig. $4^b$. The drum comprises a series of spiders $l$, equipped with spring-held movable wire-gripping devices $l'$ and intermediate gripping devices $l^2$, which are stationary relative to the drum. Cams $l^3$, carried by a transverse bar $l^4$, serve to spread the devices $l'$ apart, as shown in Fig. 7, to release the wire as it leaves the measuring-drum. The cams are equipped with suitable guide devices for the strand-wires and are adjustable transversely of the machine upon the bar $l^4$, as shown in Fig. $4^b$. In Fig. 6 is illustrated the manner in which two wires may be fed into the machine to form a single strand; but it will be understood that one wire or any number of wires may be employed for each strand.

From the foregoing detailed description the operation of the machine will be readily understood. The strand-wires are moved intermittently through the machine, moving a distance corresponding with the space between two stays at each movement. Power is applied through the medium of the belt $H^5$, thereby actuating the shaft $H^3$, through which power is transmitted, through the pinion $H^7$ and gear $H^8$, to the shaft H. The shaft H actuates the chain $H^{10}$, which in turn actuates the shafts $H^{12}$ and $H^{14}$. The drum of the take-up mechanism is moved bodily by the connecting-rods I I', actuated from the shaft $H^{14}$, the drum being positively locked against rotation during its rearward movement and turning during its return or forward movement to wind the fence upon it. In the return movement the drum is rotated through the friction devices employed, permitting slippage to accommodate for increase in size of the fence-rolls, it being understood that during the operation of the take-up mechanism the feed-drum L and tensioning devices N' grip the wires and prevent any slackness thereof. The stay-wires are fed transversely into the machine while the take-up mechanism is operating by the intermittently-actuated feed-rolls K', driven from the shaft $H^{12}$ through the medium of the chain $K^7$ and segmental gear $K^4$. The wire-straightening devices are operated by the belt $k$, the belts $k^3$ being automatically shifted through the medium of the cam $k^{13}$ on the shaft $H^{12}$, said cam serving to operate the belt-shifter $k^7$, as fully described. After the take-up mechanism has operated to draw the fence through the machine the required distance the cross-head $C^2$ is actuated by its cams, thereby raising the lower dies, during which movement the stays are cut into proper lengths. While the lower dies are held in contact with the upper dies the plunger-carrying cross-heads operate to drive the staples, and during the descent of the plunger-carrying cross-heads the knotting devices are actuated to form the knots at the ends of the stays, as already described. The return movement of the take-up drum occurs during the time that the stays in the succeeding operation are being applied, so that no time is lost in the operation of the machine.

In Figs. 2 and 3 is illustrated a device for giving warning to the operator in case a knot in any strand-wire approaches a die in order that injury to the machine may be avoided. This device comprises a rock-shaft P, equipped with a series of actuating-arms P', channeled at their free ends to receive the strand-wires, and a contact member $P^2$, carried by the rock-shaft and coacting with a contact member $P^3$, the two contact members being arranged in an electric circuit $P^4$, containing a bell $P^5$. When a knot or any strand-wire encounters an arm P', the rock-shaft is actuated, thereby closing the electric circuit and ringing the bell.

Many changes in details of construction within the spirit of my invention are contemplated Hence no undue limitation should be understood from the foregoing description, which has been given for clearness of understanding only.

What I regard as new, and desire to secure by Letters Patent, is—

1. In a wire-fabric machine, the combination with means for intermittently feeding strand-wires through the machine, of a plunger-carrying cross-head, staple-feeding means for delivering staples to the plungers of the cross-head, suitable dies for bending staples about the intermediate wires, and knotting mechanism comprising a wrapper provided with actuating means, and means carried by the plunger-carrying cross-head serving to actuate said wrapper, for the purpose set forth.

2. In a machine of the character set forth, the combination with means for intermittently moving strand-wires through the machine, of a reciprocating die-carrying cross-head, wrapping devices corresponding with the marginal wires carried by said cross-head, and reciprocating actuating devices operating upon said wrapping devices as the dies move to the closed position, for the purpose set forth.

3. In a machine of the character set forth, the combination with means for intermittently feeding strand-wires through the machine, of a reciprocating cross-head equipped with dies corresponding with the intermediate strand-wires and with wrapping devices corresponding with the marginal strand-wires, the wrapping devices having actuating-pinions, staple-feeding mechanism, and a reciprocating plunger-carrying cross-head equipped with racks serving to engage said pinions and through the medium thereof rotate the wrappers, for the purpose set forth.

4. In a machine of the character set forth, the combination of a frame having a stationary beam equipped with dies and equipped also with cams provided with yielding controlling members, a reciprocating cross-head equipped with dies and equipped also with wrappers provided with actuating-pinions and with rotary members engaging said cams and said controlling members during the movement of the cross-head, and a reciprocating plunger-carrying cross-head equipped with racks which are brought into engagement with said pinions, as and for the purpose set forth.

5. In a machine of the character set forth, the combination with means for moving strand-wires through the machine, of a beam equipped with stationary dies and equipped also with cams provided with yielding controlling members, a reciprocating cross-head equipped with dies and with wrapping devices, each wrapping device comprising a longitudinally-slotted rotary member equipped with a beveled pinion, a gear engaging said pinion and having a flat surface engaging a cam, an actuating-pinion, and a reciprocating plunger-carrying cross-head equipped with racks serving to engage and actuate said last-named pinions, for the purpose set forth.

6. In a machine of the character set forth, a reciprocating cross-head equipped with wrapping devices comprising longitudinal rotary members equipped with beveled pinions, gears engaging said pinions, and shields serving to guide the stays over said pinions as the fence moves through the machine, for the purpose set forth.

7. In a machine of the character set forth, the combination with means for moving substantially horizontally-disposed strand-wires intermittently through the machine, of a plurality of reciprocating cross-heads moving in inclined planes and equipped with staple-driving plungers, means for feeding a plurality of stays transversely of the strand-wires, staple-feeding means operating to supply staples to the several stays, and dies arranged in transverse alinement corresponding with the several stays, for the purpose set forth.

8. In a machine of the character set forth, the combination of a frame having a transverse beam equipped with two series of dies, a reciprocating cross-head equipped with two series of dies, means for moving strand-wires intermittently through the machine, means for simultaneously feeding two stays transversely of the strand-wires, and a pair of plunger-equipped reciprocating cross-heads moving in convergent planes forming acute angles with the plane of the strand-wires, the plungers of said last-named cross-heads corresponding with said first-named two series of dies, for the purpose set forth.

9. In a machine of the character set forth, the combination of a frame equipped with two series of stationary dies arranged in different transverse planes, a reciprocating cross-head equipped with two series of dies arranged in the same transverse planes as the stationary dies and equipped also with wrapping devices, a pair of reciprocating cross-heads moving in convergent planes and equipped with suitable driving-plungers and equipped also with wrapper-actuating means, means for feeding two stays in alinement with the dies transversely of the strand-wires, and means for intermittently moving the strand-wires through the machine, for the purpose set forth.

10. In a machine of the character set forth, the combination of a frame carrying two series of stationary dies arranged in different transverse planes, two series of reciprocating dies corresponding therewith, two reciprocating cross-heads moving in inclined planes and equipped with staple-driving plungers, and a shaft equipped with common actuating means for said last-named cross-heads, for the purpose set forth.

11. In a machine of the character set forth, the combination with suitable dies, of a shaft arranged above said dies, a pair of reciprocating plunger-equipped cross-heads moving in convergent planes, the plungers whereof correspond with said dies, and bell-crank levers connected with said cross-heads and actuated by said shaft, for the purpose set forth.

12. In a machine of the character set forth, the combination with suitable dies, of a shaft arranged above said dies, a pair of reciprocating plunger-equipped cross-heads moving in convergent planes, the plungers whereof correspond with said dies, a pair of vertically-moving cross-heads joined to eccentrics on said shaft, and a pair of bell-crank levers joining each of said vertically-moving cross-heads to said plunger-carrying cross-heads, for the purpose set forth.

13. In a machine of the character set forth, the combination with means for applying stays to strand-wires, of take-up mechanism operating to draw the fence through the machine, comprising a drum having a bodily movement longitudinally of the machine, and means for rotating the drum during its return movement, for the purpose set forth.

14. In a machine of the character set forth, the combination with means for applying stays to strand-wires, of take-up mechanism comprising reciprocating blocks, a drum carried thereby, a stationary rack, and a gear working in said rack and serving to rotate the drum during the return movement thereof, for the purpose set forth.

15. In a machine of the character set forth, the combination with means for applying stays to strand-wires, of take-up mechanism comprising reciprocating bearings, shafts journaled therein, gears journaled thereon, stationary racks engaging said gears, ratchet-wheels journaled on said shafts, pawls carried by said gears engaging said ratchet-wheels, ratchet-wheels frictionally connected with said first-named ratchet-wheels and positively connected with the drum, and means for positively locking said last-named ratchet-wheels during the rearward movement of the drum, for the purpose set forth.

16. In a machine of the character set forth, the combination with a suitable frame, of two series of dies arranged in different transverse planes, means for feeding two stays into the machine, means for supporting strand-wires, means for simultaneously applying the stays to the strand-wires, and take-up mechanism comprising a drum having bodily movement longitudinally of the machine and rotary movement during the return movement of reciprocation of the drum, for the purpose set forth.

17. In a machine of the character set forth, the combination with a frame carrying two series of transversely-alined stationary dies, two series of reciprocating dies, a pair of plunger-equipped cross-heads moving in inclined planes, means for supporting strand-wires, means for simultaneously feeding two stay-wires into the machine transversely of the strand-wires, and take-up mechanism comprising a drum having bodily movement longitudinally of the machine and rotary movement during the return movement of the reciprocation of the drum, for the purpose set forth.

18. In a machine of the character set forth, the combination of a frame having two series of transversely-alined stationary dies, a reciprocating cross-head equipped with two series of dies, means for feeding two stays transversely into the machine, means for supporting strand-wires, a pair of reciprocating plunger-equipped cross-heads equipped with racks, wrapping devices carried by the reciprocating die-carrying cross-head provided with pinions actuated by said racks, and take-up mechanism comprising a drum having bodily movement longitudinally of the machine and rotary movement during its return movement of reciprocation, for the purpose set forth.

19. In a machine of the character set forth, the combination with means for supporting strand-wires and applying stay-wires thereto, of a crank-shaft equipped with a pair of cranks, a pair of connecting-rods connected with said cranks, a pair of slides actuated by said rods, a take-up drum carried by said slides equipped with a gear, and a stationary rack engaging said gear, for the purpose set forth.

20. In a machine of the character set forth, the combination with means for intermittently moving strand-wires through the machine, of means for applying stays to the strand-wires, intermittently-actuated mechanism serving to feed the stays into the machine, and intermittently-actuated rotary straightening devices through which the stays pass, said straightening devices being positively actuated during the intervals of operation of said feeding mechanism, for the purpose set forth.

21. In a machine of the character set forth, the combination with means for feeding strand-wires through the machine, of a rotating shaft, a segmental gear actuated by said shaft, a pinion intermittently actuated by said segmental gear, feed-rolls actuated by said pinion, a rotary straightening device equipped with a fast and loose pulley, a continuously-moving belt, a belt-shifter serving to shift said belt from the loose to the fast pulley, and a cam on said first-named shaft serving to actuate said belt-shifter, for the purpose set forth.

22. In a machine of the character set forth, the combination of a frame, a pinion-equipped driving-shaft, a shaft extending across the top of the machine and equipped with a gear meshing with the pinion of the driving-shaft, a counter-shaft extending across the lower portion of the machine and connected by a chain with the upper shaft, cams on said counter-shaft, a vertically-moving die-carrying cross-head actuated by said cams, stationary dies located above said cross-head, stay-feeding mechanism actuated by said counter-shaft, a crank-shaft actuated by said chain, and a shiftable and rotatable take-up drum operated by said crank-shaft, for the purpose set forth.

23. In a wire-fabric machine, the combination with strand-wire-feeding means, and means for applying stays to the strand-wires, of an electric circuit equipped with an alarm device, and circuit-controlling means equipped with arms adapted for actuation by knots in the strand-wires, for the purpose set forth.

JAMES W. SNEDEKER.

In presence of—
W. B. Davies,
A. U. Thorien.